(12) United States Patent
Stauffer et al.

(10) Patent No.: US 9,999,301 B2
(45) Date of Patent: Jun. 19, 2018

(54) MODULAR PALLET RACKING SYSTEM

(71) Applicant: 560 Holdings, LLC, Seward, NE (US)

(72) Inventors: Austin J. Stauffer, Lincoln, NE (US);
Ryan B. Stauffer, Lincoln, NE (US);
Dolen Schweitzer, Friend, NE (US);
Barry Stauffer, Milford, NE (US)

(73) Assignee: 560 Holdings, LLC, Seward, NE (US)

( * ) Notice: Subject to any disclaimer, the term of this patent is extended or adjusted under 35 U.S.C. 154(b) by 0 days. days.

(21) Appl. No.: 15/590,231

(22) Filed: May 9, 2017

(65) Prior Publication Data

US 2017/0332780 A1 Nov. 23, 2017

Related U.S. Application Data

(60) Provisional application No. 62/339,430, filed on May 20, 2016, provisional application No. 62/451,158, filed on Jan. 27, 2017.

(51) Int. Cl.
*A47B 43/00* (2006.01)
*A47B 47/00* (2006.01)
(Continued)

(52) U.S. Cl.
CPC .......... *A47B 57/48* (2013.01); *A47B 47/0083* (2013.01); *A47B 47/021* (2013.01);
(Continued)

(58) Field of Classification Search
CPC ....... A47B 57/48; A47B 47/021; A47B 96/06; A47B 96/14; A47B 53/00; A47B 53/02; A47B 2210/0051; A47B 47/00; A47B 45/00; A47B 47/0025; A47B 47/0058; A47B 47/0066; A47B 47/0083; A47B 47/02; A47B 47/045; B65D 19/385; B65G 1/02; B65G 1/10; B65G 2207/30
(Continued)

(56) References Cited

U.S. PATENT DOCUMENTS

| 447,658 A | * | 3/1891 | Brockmann | ............ A47F 3/063 |
| | | | | 211/162 |
| 865,268 A | * | 9/1907 | Powell | ...................... A47F 7/30 |
| | | | | 211/175 |

(Continued)

FOREIGN PATENT DOCUMENTS

| GB | 1099554 A | 1/1968 |
| GB | 2378123 A | 2/2003 |

OTHER PUBLICATIONS

International Patent Application No. PCT/US2017/031660, International Search Report and Written Opinion dated Jul. 17, 2017, 10 pages.

*Primary Examiner* — Jennifer E. Novosad
(74) *Attorney, Agent, or Firm* — Fredrikson & Byron, P.A.

(57) ABSTRACT

A pallet racking system includes a plurality of pallet shelves connected to a plurality of columns and a plurality of suspension hanging systems coupled to the plurality of columns. Each suspension hanging system is coupled to and configured for supporting a storage unit therebelow. The suspension hanging systems are slidable relative to the plurality of pallet shelves such that the sliding movement of a suspension hanging system relative to an adjacent suspension hanging system defines an aisle space therebetween.

19 Claims, 19 Drawing Sheets

(51) Int. Cl.
*A47B 57/00* (2006.01)
*A47B 57/48* (2006.01)
*A47B 53/02* (2006.01)
*A47B 47/02* (2006.01)
*A47B 96/06* (2006.01)
*A47B 96/14* (2006.01)
*B65D 19/38* (2006.01)
*B65G 1/02* (2006.01)
*B65G 1/10* (2006.01)

(52) U.S. Cl.
CPC ............. *A47B 53/02* (2013.01); *A47B 96/06* (2013.01); *A47B 96/14* (2013.01); *B65D 19/385* (2013.01); *B65G 1/02* (2013.01); *B65G 1/10* (2013.01); *B65G 2207/30* (2013.01)

(58) Field of Classification Search
USPC ............ 211/191, 162, 175, 189, 186, 192; 312/198–201, 349
See application file for complete search history.

(56) References Cited

U.S. PATENT DOCUMENTS

| | | | | |
|---|---|---|---|---|
| 1,807,075 A * | 5/1931 | Skar | ...... | A47B 53/02 104/121 |
| 2,915,195 A | 12/1959 | Crosby | | |
| 3,427,085 A | 2/1969 | Steller | | |
| 3,519,140 A * | 7/1970 | Wellman, Jr. | ...... | A47B 53/02 104/162 |
| 3,541,966 A * | 11/1970 | Greaves | ...... | A47B 53/02 104/162 |
| 3,695,456 A | 10/1972 | Lewis | | |
| 4,412,772 A | 11/1983 | Naito et al. | | |
| 4,432,589 A * | 2/1984 | Sattel | ...... | A47B 53/02 108/23 |
| 4,615,449 A * | 10/1986 | Naito | ...... | A47B 53/02 211/162 |
| 4,657,317 A * | 4/1987 | Gemma | ...... | A47B 53/00 211/162 |
| 4,941,578 A * | 7/1990 | Devening | ...... | A47B 53/02 211/162 |
| 4,991,725 A * | 2/1991 | Welsch | ...... | A47B 53/02 211/162 |
| 5,062,535 A * | 11/1991 | Potter | ...... | A47B 53/00 211/162 |
| 5,072,838 A * | 12/1991 | Price, Jr. | ...... | A47B 53/00 211/122 |
| 5,160,189 A * | 11/1992 | Johnston | ...... | A47B 53/00 188/82.2 |
| 5,226,549 A * | 7/1993 | Price, Jr. | ...... | A47B 53/00 211/162 |
| 5,333,983 A * | 8/1994 | Hatouchi | ...... | A47B 53/02 211/1.57 |
| 5,341,944 A * | 8/1994 | Latino | ...... | A47B 53/00 211/162 |
| 5,577,348 A * | 11/1996 | Keller | ...... | E04L 32/827 160/40 |
| 5,628,415 A * | 5/1997 | Mulholland | ...... | A47B 47/027 211/186 |
| 5,680,942 A * | 10/1997 | McAllister | ...... | A47F 5/0093 16/35 R |
| 5,749,481 A * | 5/1998 | Miller | ...... | A47B 47/027 211/187 |
| 5,850,082 A | 12/1998 | Eaton et al. | | |
| 5,924,779 A * | 7/1999 | Krumholz | ...... | A47B 88/42 211/151 |
| 5,967,346 A * | 10/1999 | Price, Jr. | ...... | A47B 53/00 211/162 |
| 6,098,815 A * | 8/2000 | Nesser | ...... | A47B 61/04 211/118 |
| 6,241,106 B1 * | 6/2001 | Fujita | ...... | A47B 53/02 211/134 |
| 6,471,309 B1 * | 10/2002 | Turner | ...... | A47B 53/02 211/162 |
| 6,484,893 B1 * | 11/2002 | Tkatch | ...... | A47B 46/00 211/103 |
| 6,526,702 B2 * | 3/2003 | Jones | ...... | A47B 53/02 104/288 |
| 7,401,705 B2 * | 7/2008 | Craft | ...... | A47B 96/00 211/103 |
| 7,413,091 B2 * | 8/2008 | Krull | ...... | A47F 7/04 211/162 |
| 7,475,955 B2 * | 1/2009 | Dressendorfer | ...... | A47B 88/42 312/198 |
| 7,508,145 B2 | 3/2009 | Bourke et al. | | |
| 7,641,063 B2 * | 1/2010 | Wishart | ...... | A47B 47/027 211/189 |
| 8,121,722 B2 | 2/2012 | Tourdot et al. | | |
| 8,459,475 B2 * | 6/2013 | Higueroa | ...... | A47B 96/00 211/162 |
| 8,567,883 B2 * | 10/2013 | Hsiao | ...... | H05K 7/1488 312/201 |
| 8,827,090 B2 * | 9/2014 | Kropveld | ...... | B65G 1/026 211/113 |
| 8,947,879 B2 | 2/2015 | Broome et al. | | |
| 9,161,638 B2 * | 10/2015 | Ehmke | ...... | A47F 3/00 |
| D793,023 S | 7/2017 | Kueck | | |
| D793,647 S | 8/2017 | Kueck | | |
| 9,826,833 B2 * | 11/2017 | Chen | ...... | A47B 87/008 |
| 2003/0094884 A1 * | 5/2003 | Sobol | ...... | A47B 53/00 312/201 |
| 2004/0007550 A1 | 1/2004 | Leeman et al. | | |
| 2004/0178155 A1 * | 9/2004 | Brownfield | ...... | A47F 7/08 211/36 |
| 2005/0056605 A1 | 3/2005 | Calleja | | |
| 2009/0051255 A1 | 2/2009 | Arbel | | |
| 2010/0019631 A1 | 1/2010 | Olson | | |
| 2010/0078399 A1 | 4/2010 | Higueroa et al. | | |
| 2016/0143176 A1 | 5/2016 | Bernard | | |
| 2016/0198846 A1 | 7/2016 | McCuistion | | |

\* cited by examiner

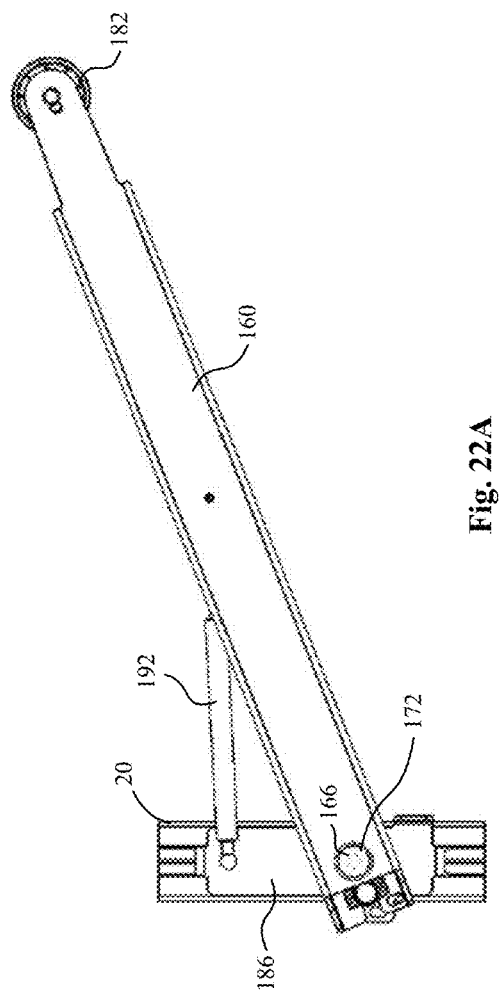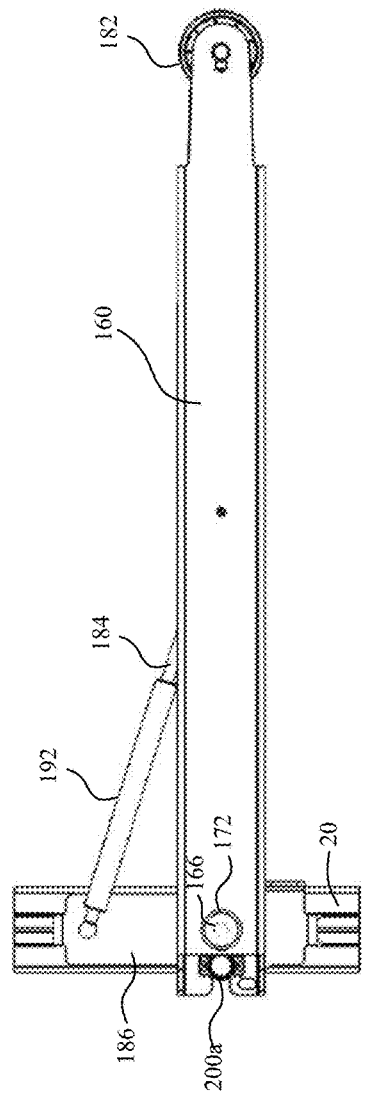

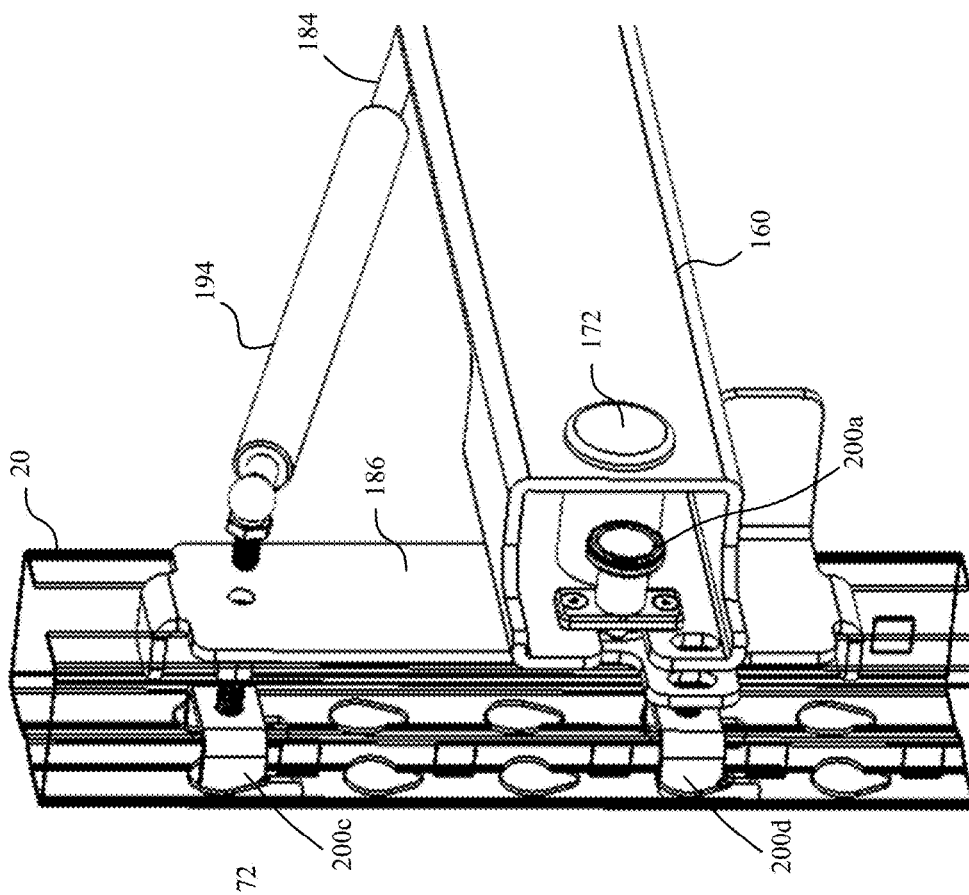
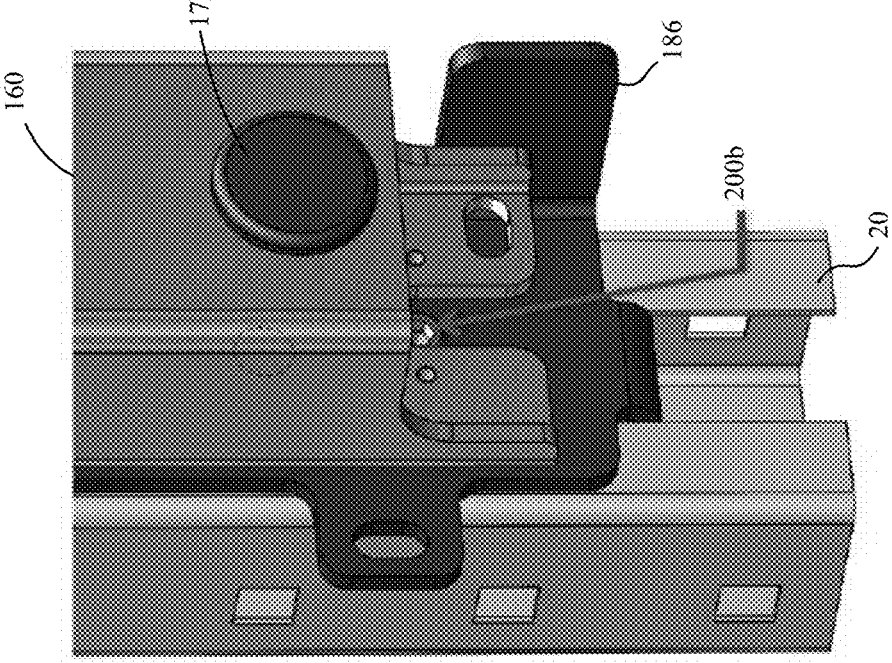
Fig. 23B
Fig. 23A

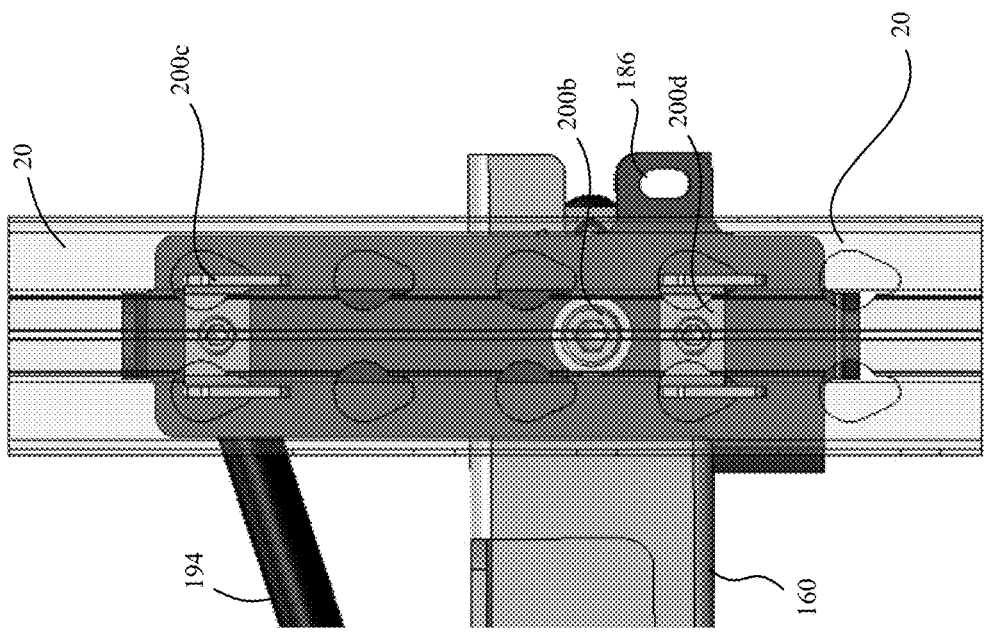
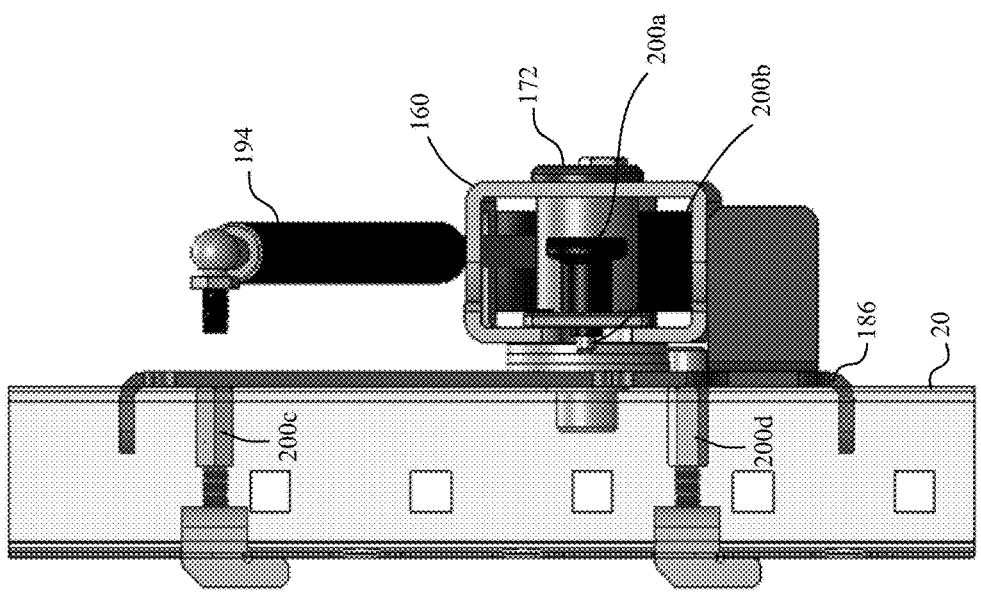
Fig. 24B
Fig. 24A

MODULAR PALLET RACKING SYSTEM

CROSS-REFERENCE

This application claims the benefit of U.S. Provisional Patent Application No. 62/339,430, filed May 20, 2016, and U.S. Provisional Patent Application No. 62/451,158, filed Jan. 27, 2017. The entire contents of both these applications are incorporated herein by reference.

BACKGROUND

Pallet racking systems can be used in residential and industrial storage solutions such as garages, basements, stores, shop floors, and the like for storing shipping pallets, tools, equipment, tires and the like. Typically such pallet racking systems have one or more pallet shelves supported by a plurality of columns and beams. The pallet shelves act as storage shelves. Such systems typically take up large amounts of floor space and may make it difficult for a user to access these items. Further, a user may not be able to customize the pallet racking system to increase the amount of space available for storage, or to reduce the overall dimensions of the pallet racking system to accommodate compact storage locations (such as garages or basements).

SUMMARY

In an aspect, a modular pallet racking kit is provided, which is connectable to one or more anchoring columns connected to one or more pallet shelves, so as to support a plurality of suspended storage units suspended below a pallet shelf. The modular pallet racking kit can include a plurality of suspension hanging systems. Each suspension hanging system can be connectable to a respective storage unit therebelow. Each suspension hanging system can be slidable relative to the anchoring columns in a sliding direction generally perpendicular to at least one anchoring column. Each suspension hanging system can have a suspension hanger having a plurality of connection interfaces for connecting to a storage unit suspended therebelow. The kit can include a plurality of shelf frames. Each shelf frame can include one or more connector interfaces connectable to a respective storage unit. The connector interfaces can be further connectable to the connection interfaces of a respective suspension hanger, such that when connected, each storage unit is suspended from each suspension hanger, and is slidable relative to an adjacent storage unit along the sliding direction.

In another aspect, each suspension hanging system can be oriented such that a line perpendicular to a front surface of the storage unit suspended below a respective suspension hanging system is generally parallel to the sliding direction.

In a further aspect a method of assembling a modular pallet racking system can involve the step of providing a modular pallet racking system according to any embodiment. The method can include the step of connecting a first beam and a second beam to one or more anchoring columns. The method can include the steps of assembling a plurality of suspension hanging systems, by engaging each roller system to a corresponding suspension hanger and positioning the plurality of suspension hanging systems on the first and the second beams so as to providing sliding engagement between the suspension hanging systems and the first and second beams. The method can further include the steps of assembling a plurality of storage units, by engaging one or more shelf frames to a respective storage unit and connecting one or more storage unit shelves to a respective connector interface of a shelf frame.

The details of one or more examples are set forth in the accompanying drawings and the description below. Other features, objects, and advantages will be apparent from the description and drawings, and from the claims.

BRIEF DESCRIPTION OF DRAWINGS

FIG. 22A and FIG. 22B illustrate respectively, the locking assembly at an intermediate position and a locked position;

FIG. 23A and FIG. 23B are enlarged views of a lower portion of the locking assembly shown in an unlocked position, and a locked position respectively.

FIG. 24A and FIG. 24B illustrate, respectively, a side view and a back view of the locking assembly of FIG. 20.

DETAILED DESCRIPTION

Embodiments of the present disclosure provide a pallet racking system. Pallet racking systems such as the present embodiments can be used in residential and industrial storage solutions such as garages, shop floors, and the like. Pallet racking systems according to the present embodiment provide a compact storage solution that minimizes the amount of floor space (e.g., in linear foot) occupied by the pallet racking systems, while creating a modular storage solution with storage units that can be added or removed to accommodate a user's needs. Further, the entire pallet racking system can be shipped to a customer as a kit, providing the ability to customize the dimensions of the pallet racking system, and minimizing transportation costs.

Figure 1:
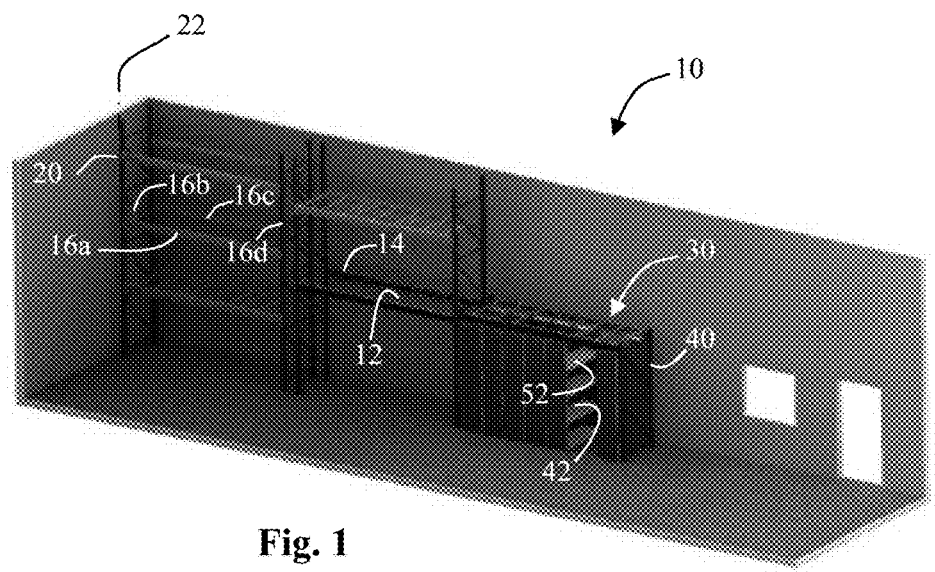
FIG. 1 is a perspective view of a pallet racking system according to an embodiment.

FIG. 1 shows a pallet racking system 10 according to an embodiment showing components of a modular pallet racking kit in an assembled configuration. The pallet racking system 10 can be positioned on a floor surface. Certain components of pallet racking system 10 can be an existing pallet racking system comprising a plurality of pallet shelves 12. As seen in FIG. 1, the pallet shelves 12 are generally rectangular in shape having a generally planar surface 14 (e.g., the top surface) defined by a plurality of edges 16a, 16b, 16c and 16d. The generally planar surface 14 of the pallet shelves 12 can support articles that are stored thereon. Further, the pallet shelves 12 can be made of rigid materials such as wood or metal to support the weight of articles stored thereon. In the illustrated embodiment, the pallet shelves are made of wire-mesh shelves. While a rectangular shape is illustrated, the pallet shelves 12 can be of any desired shape and sized to accommodate a variety of storage needs at homes and businesses. In the system 10, the pallet shelves 12 may either be included in the modular pallet racking kit. Alternatively, the user may assemble components of the kit into an existing pallet rack or other anchoring and/or support structures.

Figure 2:
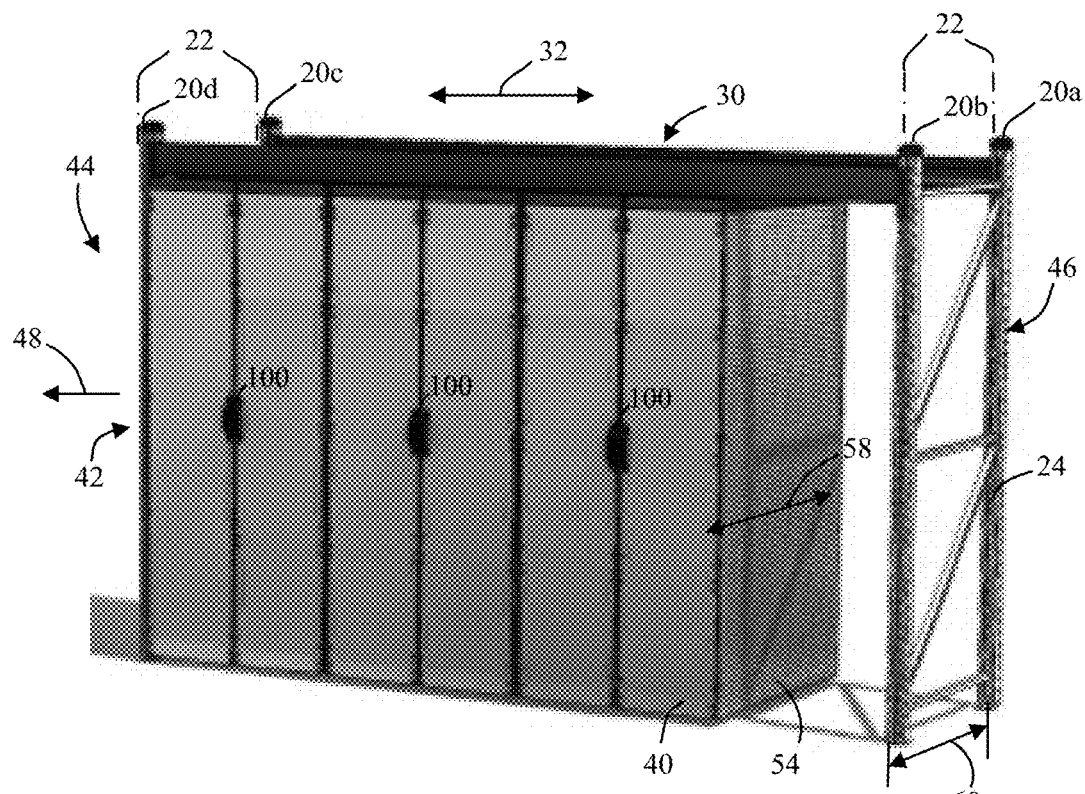
FIG. 2 is an enlarged perspective view of a lower portion of the pallet racking system of FIG. 1.

With continued reference to FIG. 1, the pallet shelves 12 are connected to and supported by a plurality of anchoring columns 20. As is the case with pallet shelves 12, the anchoring columns 20 may either be included in the modular pallet racking kit, or the user may use existing anchors and/or other support structures. The anchoring columns 20 are disposed generally along a column axis 22 passing through each anchoring columns 20. As seen in FIGS. 1 and 2, the column axis 22 of each anchoring columns 20 can be generally perpendicular to the planar surface 14 of the pallet shelves 12. For instance, if the pallet shelves 12 are positioned such that the planar surface 14 of the pallet shelves 12 are generally horizontal, the anchoring columns 20 can be positioned generally vertical on a floor surface.

Each anchoring columns 20 can be elongate in shape. For instance, the anchoring columns 20 can be of a height that can be substantially greater than their width or thickness. Further, the anchoring columns 20 can have a desired cross-sectional profile (such as rectangular, circular, oval, triangular, wedge-shaped and the like) and be made of a rigid material such as a metal so as to withstand and support the weight of the pallet shelves 12 and any articles that may be stored thereon.

With continued reference to FIG. 1, the pallet racking system 10 can be modular in that the distance between any two columns 20 of the plurality of anchoring columns 20 can be adjustable so as to vary overall dimensions of the pallet racking system 10 to cater to a user's needs. Further, any number of pallet shelves 12 may be positioned at any point generally along the column axis 22 so as to modularly connect a pallet shelf 12 anywhere on the anchoring columns 20 generally along the column axis 22. For instance, the anchoring columns 20 may have a plurality of connection points 24 positioned on along the column axis 22. The connection points 24 can facilitate connecting a pallet shelf 12 to anchoring columns 20. In one example perhaps best seen in FIG. 5, the connection points 24 can be apertures. In such cases, the pallet shelves 12 can have corresponding apertures for inserting a fastener (e.g., screws, bolts and the like) therethrough to connect to the anchoring columns 20. In some cases, there can be a plurality of apertures spaced evenly about the anchoring columns 20 such that the pallet shelves 12 can be positioned at any point on the anchoring columns 20, so as to vary the spacing (e.g., along the column axis 22) between adjacent pallet shelves 12.

Referring back to FIGS. 2 and 3, the pallet racking system 10 comprises a plurality of suspension hanging systems 30. The suspension hanging systems 30 are slidable relative to the plurality of pallet shelves 12 in a sliding direction 32 generally perpendicular to the column axis 22. The suspension hanging system 30 can support a storage unit 40 therebelow as will be described further below. While the illustrated examples show six storage units 40, additional (seven, eight, or more), or fewer (five, four or less) storage units 40 can be provided. Accordingly, the amount of storage space provided by the pallet racking system 10 can be substantially increased without increasing the amount of floor space occupied by the pallet racking system 10. In some embodiments, the suspension hanging systems 30 are oriented relative to the pallet shelves 12 so as to maximize storage while occupying less floor space. For instance, the front surface 42 of the storage unit 40 can be oriented facing a lateral side 44 of the pallet racking system 10. In this orientation, a line 48 perpendicular to a front surface 42 of the storage unit 40 can be generally parallel to the sliding direction 32 of the suspension hanging system. As used herein, the term front surface 42 may not necessarily be restricted to a physical surface (e.g., solid surface) and may also include a plane comprising at least one front edge 41 (best seen in FIG. 2) of a storage unit 40. Further, the at least one front edge 41 of the storage unit 40 may be in a direction perpendicular to the sliding direction 32. Optionally, the front surface may include at least the top edge 43 (best seen in FIG. 3). Further, the orientation of the suspension hanging system and the sliding movement of a suspension hanging system relative to an adjacent suspension hanging system can be used to create an aisle space 50 therebetween. Such embodiments may advantageously permit a user to connect a plurality of storage units to pallet racks and thereby increase storage space without necessarily increasing the floor space occupied by the pallet racking system.

As is apparent to one skilled in the art, each storage unit 40 suspended below the suspension hanging system comprises a plurality of storage unit shelves 52. The storage unit shelves 52 extend between the front surface 42 of the storage unit 40 and a rear surface 54 of the storage unit 40. As seen in FIG. 2, the rear surface 54 generally faces a lateral side 46 of the pallet racking system. The storage unit shelves 52 generally face the lateral sides 44 of the pallet racking system 10. Once the storage unit 40 is slid to create an aisle space 50, a user may step into the aisle space 50 while facing the front surface 42 of the storage unit 40 and access articles stored in a shelf 52 of the storage unit 40. The storage unit 40 can be made of any desired material such as wood, plastic, metal, and the like.

Figure 3:
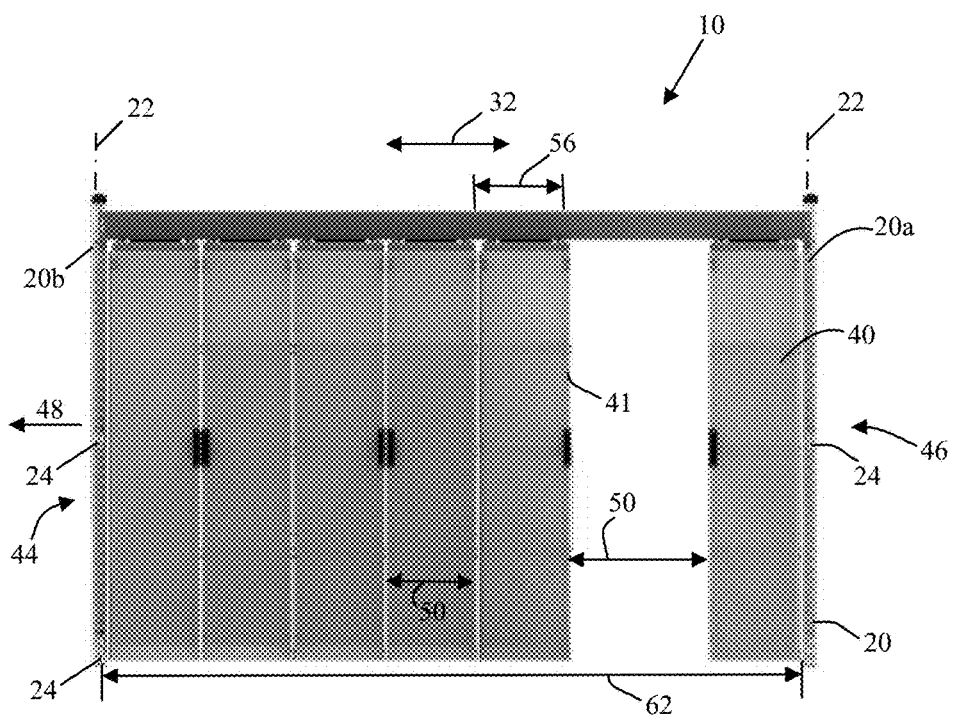
FIG. 3 is a front view of a lower portion of the pallet racking system of FIG. 1.

As is apparent from FIGS. 2 and 3, the storage units 40 have a depth 56 in a direction generally parallel to the sliding direction 32 and a width 58 in direction generally perpendicular to the sliding direction 32 due to the lateral orientation of the storage units 40 with respect to the pallet racking system 10. Further, the pallet racking system 10 has an overall depth 60 in a direction generally perpendicular to the sliding direction 32 and an overall width 62 in a direction generally parallel to the sliding direction 32. The storage unit 40 may be of a dimension such that the width 58 of each storage unit 40 corresponds to the overall depth 60 of pallet racking system 10, and the sum of depths of all the storage units 40 can be less than the overall width 62 of the pallet racking system 10. Such embodiments allow the storage units 40 to be pushed so as to create an aisle space 50 between two shelves 52. For instance, the difference between the overall width 62 of the pallet racking system 10 and the sum of depths of the storage units 40 can be between about 9 feet and about 10 feet for a pallet racking system 10 having an overall width 62 of about 12 feet, thereby providing between about 2 feet and about 3 feet of aisle width when the storage units 40 are moved. As mentioned previously, however, the overall width 62 and the overall depth 60 of the pallet racking system 10 can be varied to accommodate additional storage units 40 by simply increasing the spacing between the anchoring columns 20. In some examples, the overall depth 60 can be between about 24 inches and about 48 inches. Such embodiments provide modularity by allowing a user to customize the dimensions of their pallet racking system 10 and add or remove storage units 40 depending on their storage requirements.

With continued reference to FIG. 2 and referring back to FIG. 1, the storage units 40 are coupled to and supported by the suspension hanging systems 30 such that the storage units 40 may not be in contact with the floor surface and substantially suspended from the suspension hanging system 30. In such cases, the suspension hanging system 30 would substantially support the weight of the storage units 40, and transfer the weight to the anchoring columns 20 of the pallet racking system 10. In some advantageous examples, nearly 100% of the weight of the storage unit 40 and any articles stored thereon can be supported by the suspension hanging system 30. The storage unit 40 can be suspended above the floor surface, thereby leaving a gap between the bottom of the storage units 40 and the floor surface. Further, the suspension hanging system 30 can be designed to be load bearing member such that when the storage units 40 are slid, the suspension hanging system 30 can withstand and/or support dynamic loads due to the sliding motion of the storage units 40 as well as their weight and those of any articles stored thereon. In certain embodiments, the anchoring columns 20 may be placed on an uneven surface, and in such embodiments, advantageously, leveling may be performed (e.g., using one or more shims), so as to create a desirable gap between the bottom of the storage units 40 and the floor surface.

Figure 4:
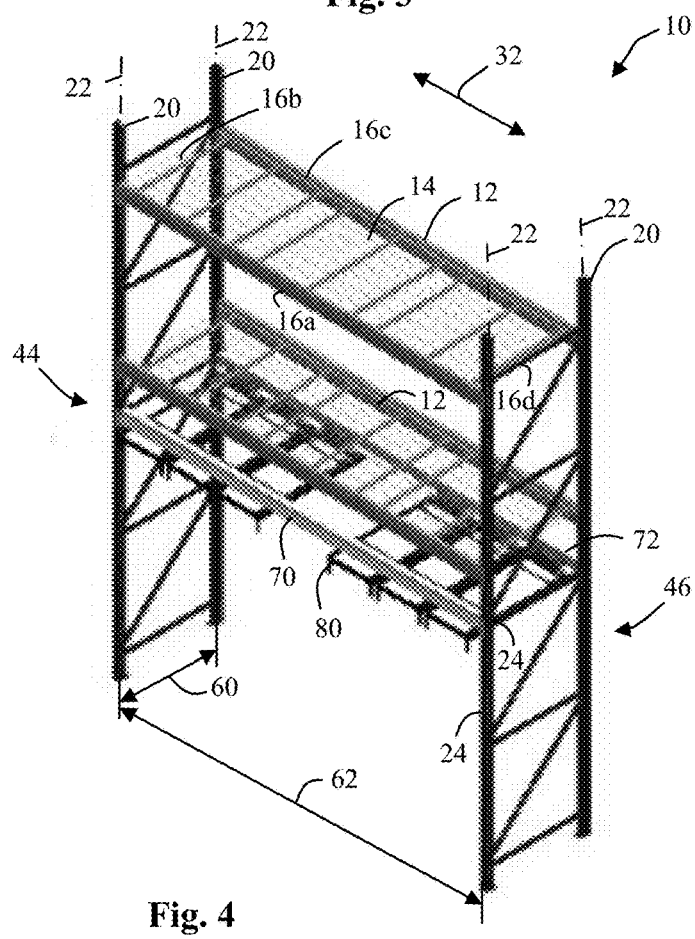
FIG. 4 is a perspective view of the pallet racking system of FIG. 1 with storage units removed to illustrate internal details.
Figure 5:
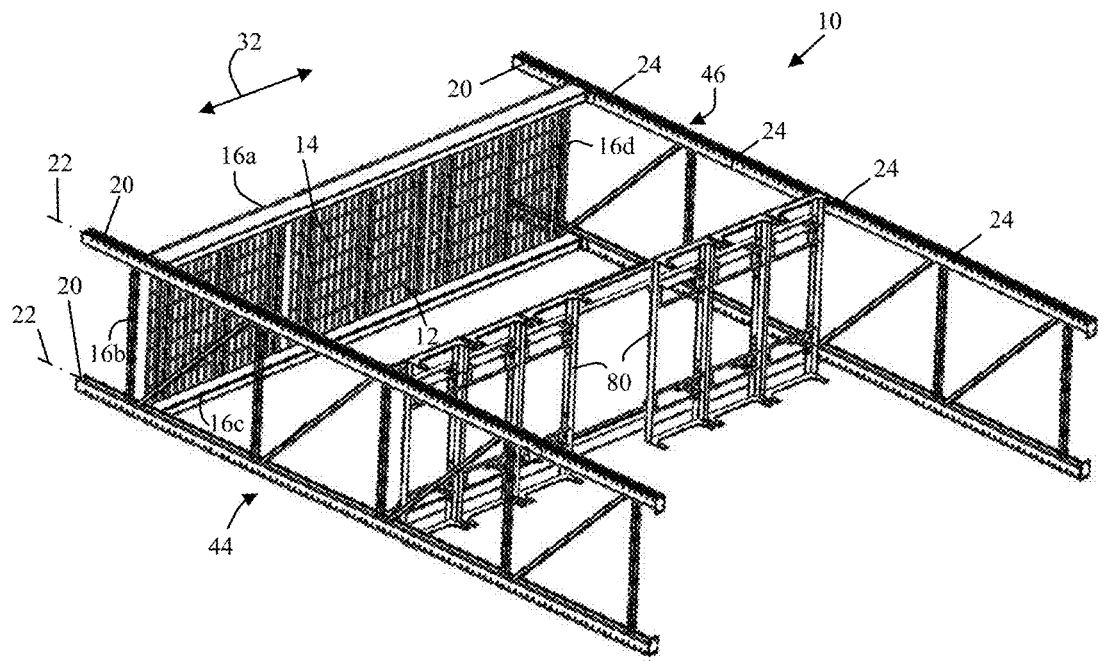
FIG. 5 is a bottom perspective view of the pallet racking system of FIG. 1 with storage units removed to illustrate internal details.
Figure 6:
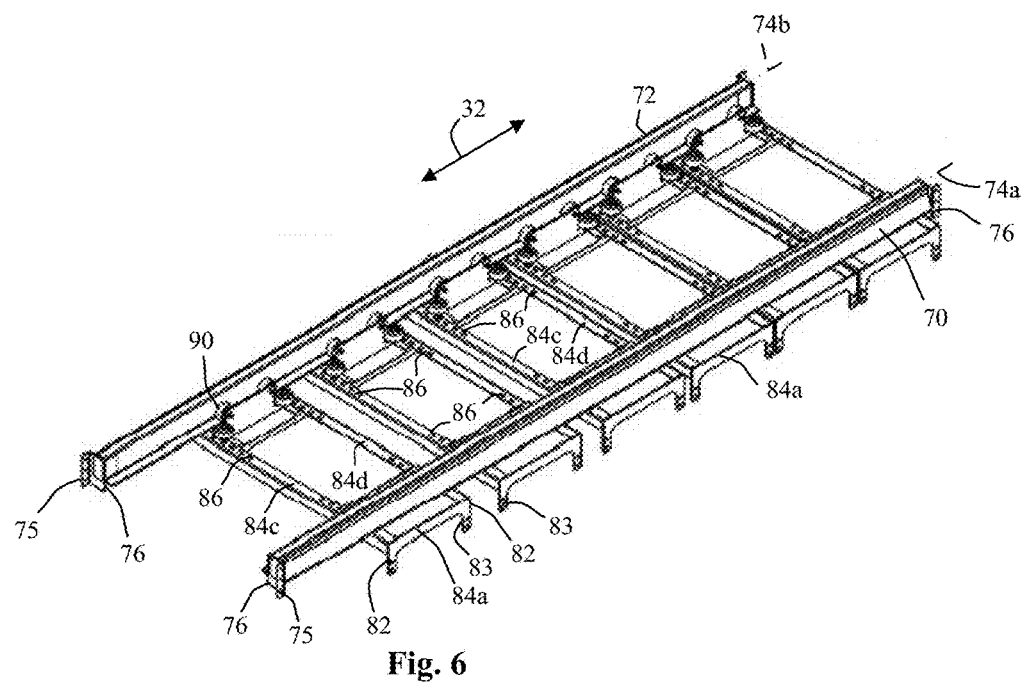
FIG. 6 is a perspective view of a suspension hanging system for a pallet racking system according to an embodiment.

FIGS. 4 and 5 illustrate a front and bottom perspective view, respectively, of the pallet racking system 10 with the storage units 40 removed for clarity to better illustrate the orientation of the suspension hanging system 30. FIG. 6 illustrates a top perspective view of the suspension hanging system 30 according to an embodiment. As seen in FIG. 6, the suspension hanging system 30 comprises a first beam 70 and a second beam 72 each being connectable to anchoring columns 20 of the plurality of anchoring columns 20. As was the case with the pallet shelves 12 and anchoring columns 20, the beams 70, 72 may either be provided as a part of the kit. Alternatively, the user may use existing rails or beams to minimize overall dimensions of the system. When connected, as seen in FIG. 5, the first beam 70 and the second beam 72 are generally parallel to each other.

Referring again to FIG. 6, the first and second beams are generally elongate in shape having a longitudinal axis 74a, 74b. Referring back to FIG. 5, the longitudinal axes 74a, 74b of each of the first and second beams 70, 72 can be generally perpendicular to the column axis 22 and generally parallel to the sliding direction 32 when the first and second beams 70, 72 are connected to the plurality of anchoring columns 20.

The first and second beams 70, 72 facilitate connecting the suspension hanging system 30 to the plurality of anchoring columns 20. As referred to previously, each anchoring columns 20 of the plurality of anchoring columns 20 comprise a connection point 24. The connection points 24 can connect to the first and second beams 70, 72 via corresponding connection points 75, 76. For example, the connection points 24 can be apertures. In such cases, the first and second beams 70, 72 can have a plurality of corresponding apertures to connect with the anchoring columns 20 by inserting a fastener (e.g., screws, bolts and the like) through the apertures of the first and second beams 70, 72 and the anchoring columns 20. As illustrated, the corresponding connection points 75, 76 of the first and second beams 70, 72 can be apertures 75 provided on a bracket 76 that can be connected to (e.g., via fasteners or welded connection) or extends from the first and second beams 70, 72. Appreciably, the first beam 70 and second beam 72 can be adjustably connected by way of connection points 75, 76 to anchoring columns 20 at any location thereon, thereby promoting modularity of the system. Further, such systems may facilitate housing the entire system in places where floor space is limited without losing storage space.

The first and second beams 70, 72 can be of sufficient rigidity to support a substantial weight of the storage units 40, such that the storage units 40 are "suspended" above the floor surface, leaving a gap between the bottom of the storage units 40 and the floor surface. For instance, the first and second beams 70, 72 can support about 100% of the weight of storage units 40 (and any items stored thereon). Further, the first and second beams 70, 72 can withstand dynamic loads acting thereon when storage units 40 are slid. For example, the first and second beams 70, 72 can be made of a rigid metal (such as steel) and have a cross-sectional profile that permits the first and second beams 70, 72 to act as load bearing members to accommodate the weight of the storage units 40 and any articles stored thereon, as well as dynamic loads such as shear and/bending forces that act on the first and second beams 70, 72 during sliding of the storage units 40. Further, the cross-sectional profile of the first and second beams 70, 72 can also be configured such that a variety of widths of storage units 40 can be accommodated, as will be described further below. The cross-sectional profile of the first and second beams 70, 72 also allows for integration of a wire grate which nests on top of the beams 70, 72, wherein the wire grate can act the pallet shelf 12.

With continued reference to FIGS. 5 and 6, the suspension hanging system 30 comprises a plurality of suspension hangers 80 slidably connectable to the first beam 70 and the second beam 72. When slidably connected, each suspension hanger 80 can be movable generally along the longitudinal axes 74a, 74b of the first beam 70 and the second beam 72 respectively. Each suspension hanger 80 can connect to a storage unit 40 therebelow (as will be further described), such that when assembled, a storage unit 40 can be pushed to create aisle space 50 between adjacent storage units 40.

Figure 7:
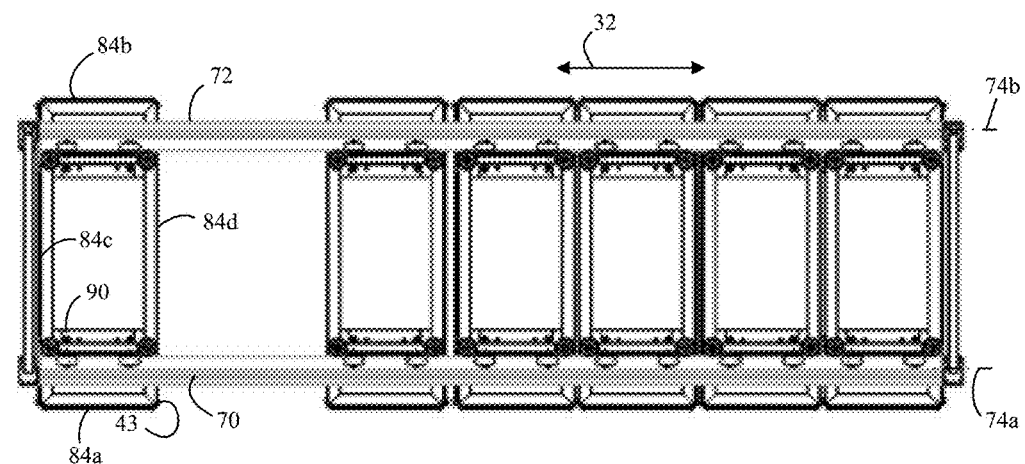
FIG. 7 is a top view of the suspension hanging system of FIG. 6.
Figures 8A, 8B:
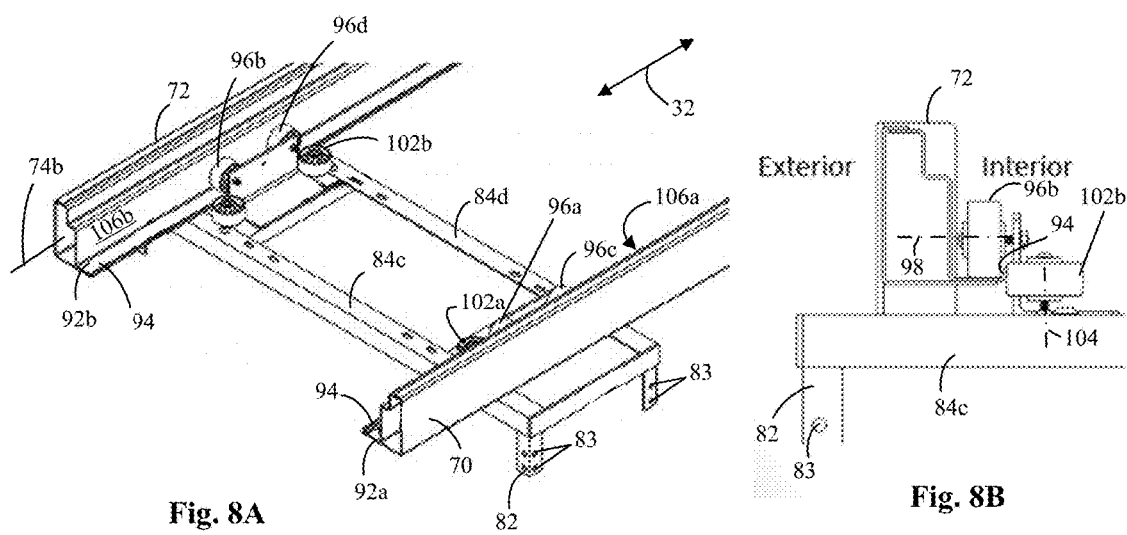
FIG. 8A is an enlarged perspective view of a portion of the suspension hanging system of FIG. 6 showing the roller system on internally configured tracks.
FIG. 8B is a side perspective view of a portion of the suspension hanging system of FIG. 6 showing the roller system on internally configured tracks.

Referring now to the top and side perspective views of FIGS. 7 and 8A, the suspension hangers 80 each comprise a plurality of connection interfaces 82 for connecting to a storage unit 40 suspended therebelow. In the embodiments illustrated in FIGS. 7 and 8A, the connection interfaces 82 are elongate in shape with a plurality of apertures 83 for connecting to the storage units 40. The connection interfaces 82 are on the lateral sides 44 of the suspension hangers 80, but could alternatively be positioned at other locations so as to connect to storage units 40 of different sizes and shapes. The connection interfaces 82 can be made of the same material as the suspension hanger 80 and can have sufficient rigidity to withstand the weight of the storage unit 40 and any articles stored thereon and/or dynamic loads (e.g., during sliding). For example, the connection interfaces 82 can be made of metals such as steel. Alternatively, the connection interfaces 82 can be made of wood or plastic for relatively light-weight applications.

With continued reference to FIGS. 7 and 8A, the connection interfaces 82 are coupled to a plurality of elongate members of the suspension hangers 80. For example, the connection interfaces 82 are coupled to a first elongate member proximal 84a to the first beam 70 and a second elongate member 84b proximal to the second beam 72. When coupled as illustrated in FIGS. 7 and 8A, the first and second elongate members as well as the connection interfaces 82 extend below a plane on which the first and second beams 70, 72 are disposed. Such embodiments permit connecting the suspension hanger 80 to connect to a roller system 90 for slidably engaging with the first and second beams.

The suspension hangers 80 also comprise a third elongate member 84c and a fourth elongate member 84d generally perpendicular to the first and second elongate members 84a, 84b respectively, such that the elongate members define a generally rectangular shape. Other shapes such as square, triangular, oval, circular and wedge shaped are also contemplated within the scope of this disclosure. The connection interfaces 82 are thus positioned at the intersection between each of the elongate members. The first and second elongate members 84a, 84b are generally parallel to each other, and the third and fourth elongate members 84c, 84d are generally parallel to each other. The first, second, third and fourth elongate members thus define a frame of the suspension hanger 80. The first and second beams 70, 72 are positioned such that their longitudinal axes 74a, 74b are generally parallel to the first and second elongate members 84a, 84b respectively.

Figures 9A, 9B:
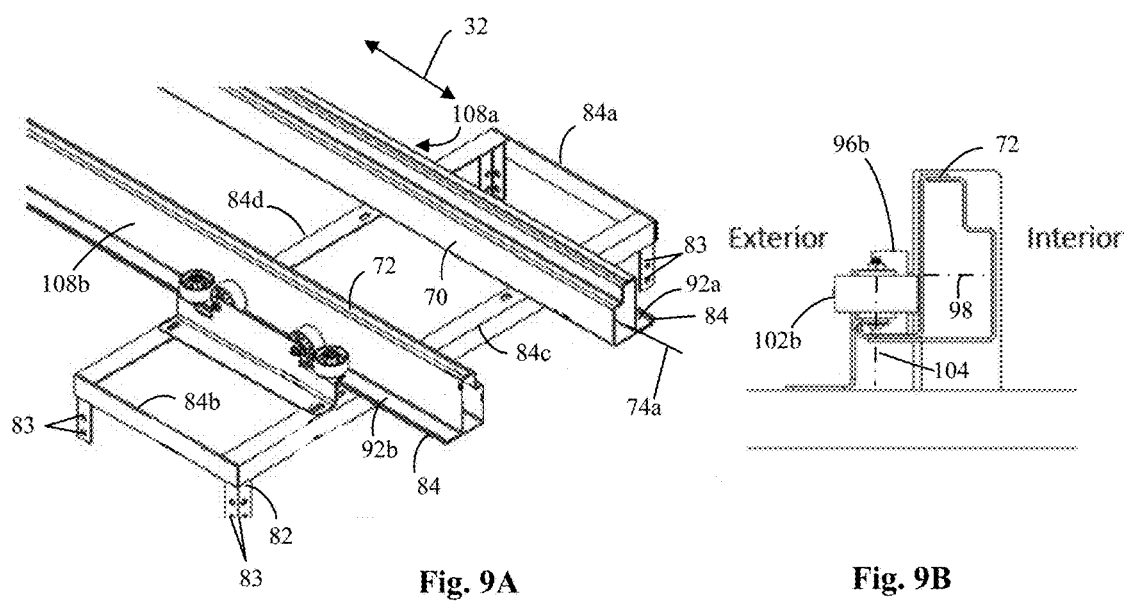
FIG. 9A is an enlarged perspective view of a portion of the suspension hanging system of FIG. 6 showing the roller system on externally configured tracks.
FIG. 9B is a side perspective view of a portion of the suspension hanging system of FIG. 6 showing the roller system on externally configured tracks.
Figure 10:
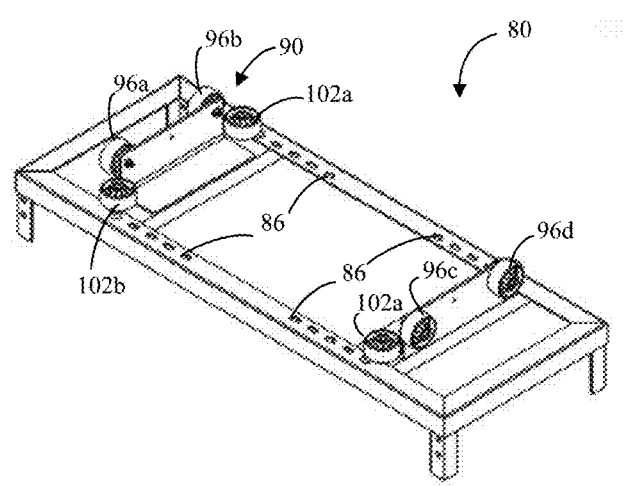
FIG. 10 is a top perspective view of a suspension hanger according to an embodiment.

Referring to FIGS. 8A, 9A and 10, the third and fourth elongate members 84c, 84d have a plurality of connection points 86 for connecting to a roller system 90 described further below. The connection points 86 are defined along the third and fourth elongate members 84c, 84d such that the roller system 90 is connectable at various points along the third and fourth elongate members 84c, 84d. The connection points 86 can be apertures or slots with corresponding apertures or slots provided on the roller systems such that they can be connected using fasteners (e.g., bolts, screws and the like). The roller system 90 can be removably connected to any aperture or slot on the third and fourth elongate members 84c, 84d so as to accommodate a variety of storage requirements and available space for housing the pallet racking system 10, thereby providing a customizable and modular construction of the pallet racking system 10.

As seen in FIGS. 7 and 8A, the suspension hanging system comprises a plurality of roller systems. Each roller system 90 can be connectable to a suspension hanger 80 and slidable along the first and second beams 70, 72 by way of rollers rolling on tracks 92a, 92b extending from the first and second beams 70, 72. For example, a first track 92a extends from the first beam 70 and a second track 92b extends from the second beam 72. The rollers of the roller system 90 are slidably engageable with the first track 92a and the second track 92b. The slidable engagement of the first and second tracks 92a, 92b can be configured for sliding the storage unit 40 suspended from each suspension hanger 80 in a guided manner. The first and second tracks 92a, 92b can each have a lip 94 (best seen in FIGS. 8B and 9B) that acts to secure and back up the roller system 90 and prevent disengagement thereof from the tracks 92a, 92b.

As perhaps best seen in FIGS. 8A, 9A and 10, the roller system 90 comprises at least a pair of track rollers 96a, 96b that are slidable along the first and second beams 70, 72. The track rollers 96a, 96b can be made of materials such as Delrin or other polymers so that they are generally rigid. The track rollers 96a, 96b are rotatable about a track roller rotational axis 98. In the embodiment shown in FIGS. 8A, 9A and 10, the track roller rotational axis 98 can be generally horizontal. The track rollers 96a, 96b can slide along the first and second beams 70, 72 when a pushing force is applied on the storage units 40 (e.g., by grabbing the storage unit 40 using the handles 100 illustrated in FIG. 2 and applying a force thereon) connected to the suspension hangers 80. Referring again to FIGS. 8A, 9A and 10, when pushed, the track rollers 96a rotate and facilitate sliding the suspension hanger 80 and the storage unit 40 connected thereto. In the illustrated embodiment, each of the first and second tracks 92a, 92b has two track rollers sliding thereon. That is, the first track 92a has two track rollers 96a, 96c and the second track 92b has two track rollers 96b, 96d rolling thereon. Additional or fewer track rollers are contemplated within the scope of this disclosure.

Referring again to FIGS. 8A, 9A and 10, the roller system 90 comprises at least a pair of guide rollers 102a, 102b. The guide rollers 102a, 102b are "idler" rollers, and may not slide on the first and second tracks 92a, 92b. The guide rollers 102a, 102b are rotatable about a guide roller rotational axis 104. The guide roller rotational axis 104 can be generally perpendicular to the track roller rotational axis 98. Thus, in the illustrated embodiments, the guide roller rotational axis 104 can be generally vertical. As was the case with track rollers, the guide rollers can also be made of polymers such as Delrin. Further, while two guide rollers 102a, 102b adjacent to each track (totaling four guide rollers per roller system 90) are illustrated, additional or fewer guide rollers are also contemplated. The guide rollers are positioned in a plane parallel to the first track 92a and second track 92b, such that the guide rollers guide the suspension hangers 80 and the storage units 40 suspended thereunder to slide along the first and second track 92a, 92b in a guided manner. For example, if any of the track rollers 96a, 96b, 96c, 96d disengage from the first and second tracks 92a, 92b or when the first and second tracks 92a, 92b are non-parallel to each other or have non-uniformities, the track rollers 96a, 96b, 96c, 96d may separate from the first and second tracks 92a, 92b when guide rollers are not present. The guide rollers therefore provide guided sliding of the storage units 40 and improve smoother movement during use.

As mentioned previously, the pallet racking system 10 can be of a modular design allowing the user to customize the dimensions of the pallet racking system 10. Accordingly, some example embodiments permit adjusting the overall width 62 of the pallet racking system 10 so as to accommodate storage units of various widths. In such embodiments, the first and second beams 70, 72 can be positioned proximal to the first and second elongate members 84a, 84b of the suspension hangers 80. Further, the first and second tracks 92a, 92b can be arranged to face each other as shown in FIGS. 8A and 8B. For instance, the first track 92a extends from an interior surface 106a of the first beam 70, and the second track 92b extends from an interior surface 106b of the second beam 72. The interior surfaces 106a, 106b of the first and second beams 70, 72 can be configured to face toward each other. Further, the roller system 90 can be connected to connection points 86 of the third elongate member 84c at a location proximal to the first and second elongate members 84a, 84b, such that the track rollers 96a, 96b, 96c, 96d roll on the interiorly-oriented first and second tracks 92a, 92b.

Alternatively, the pallet racking system 10 may have to be housed in compact storage areas such as basements or garages. In such cases, the overall width 62 of the pallet racking system 10 may have to be reduced. Accordingly, the first and second beams can be oriented such that the track rollers 96a, 96b, 96c, 96d roll on first and second tracks 92a, 92b that are oriented exterior to each other as shown in FIGS. 9A and 9B. For instance, the first track 92a can extend from an exterior surface 108a of the first beam 70, and the second track 92b can extend from an exterior surface 108b of the second beam 72. The exterior surface 108a, 108b of the first and second beams 70, 72 can be configured to face away from each other. Such a configuration can be suitable for compact storage needs.

Figure 11:
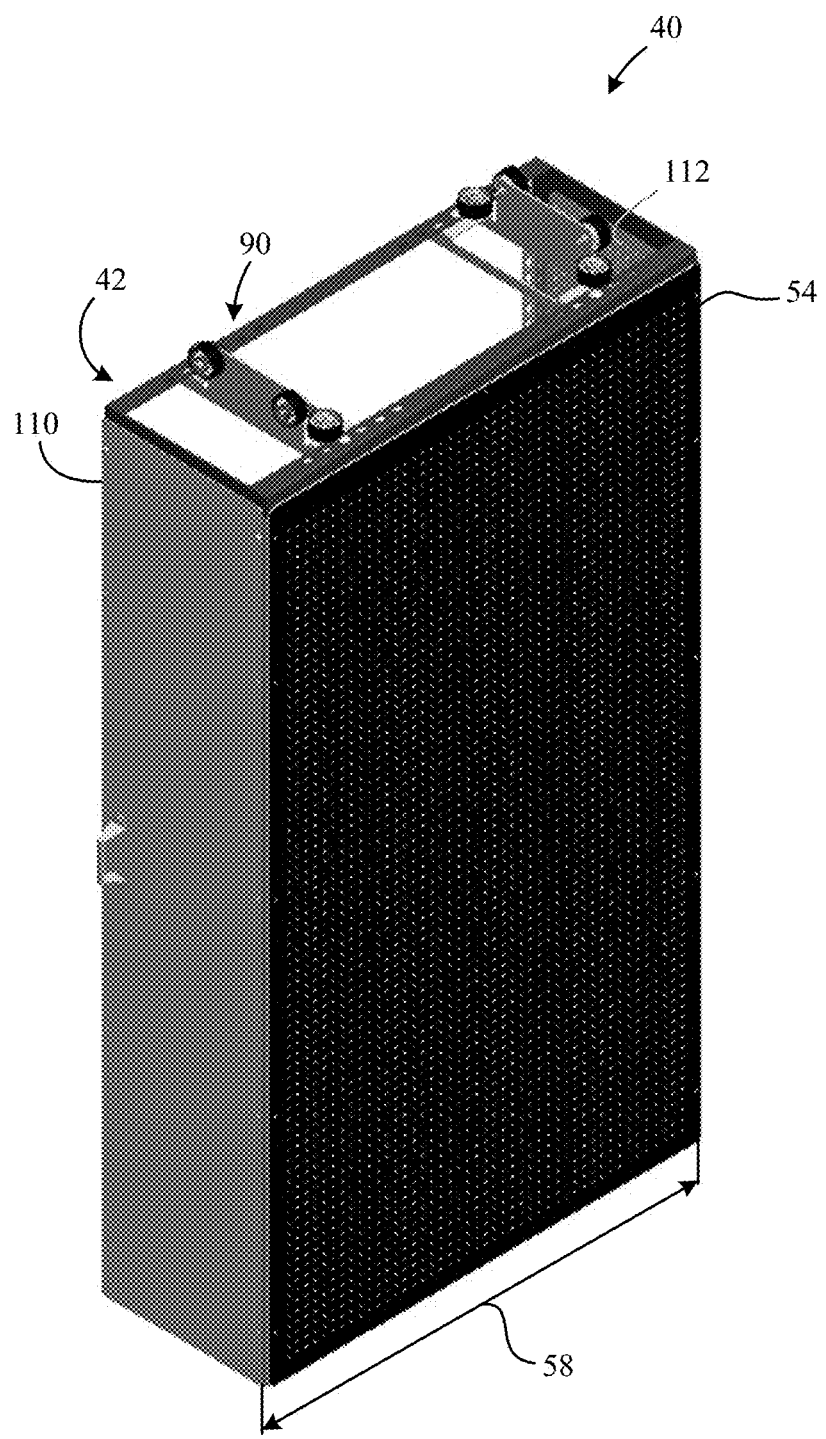
FIG. 11 is a perspective view of an exemplary storage unit.
Figure 12:
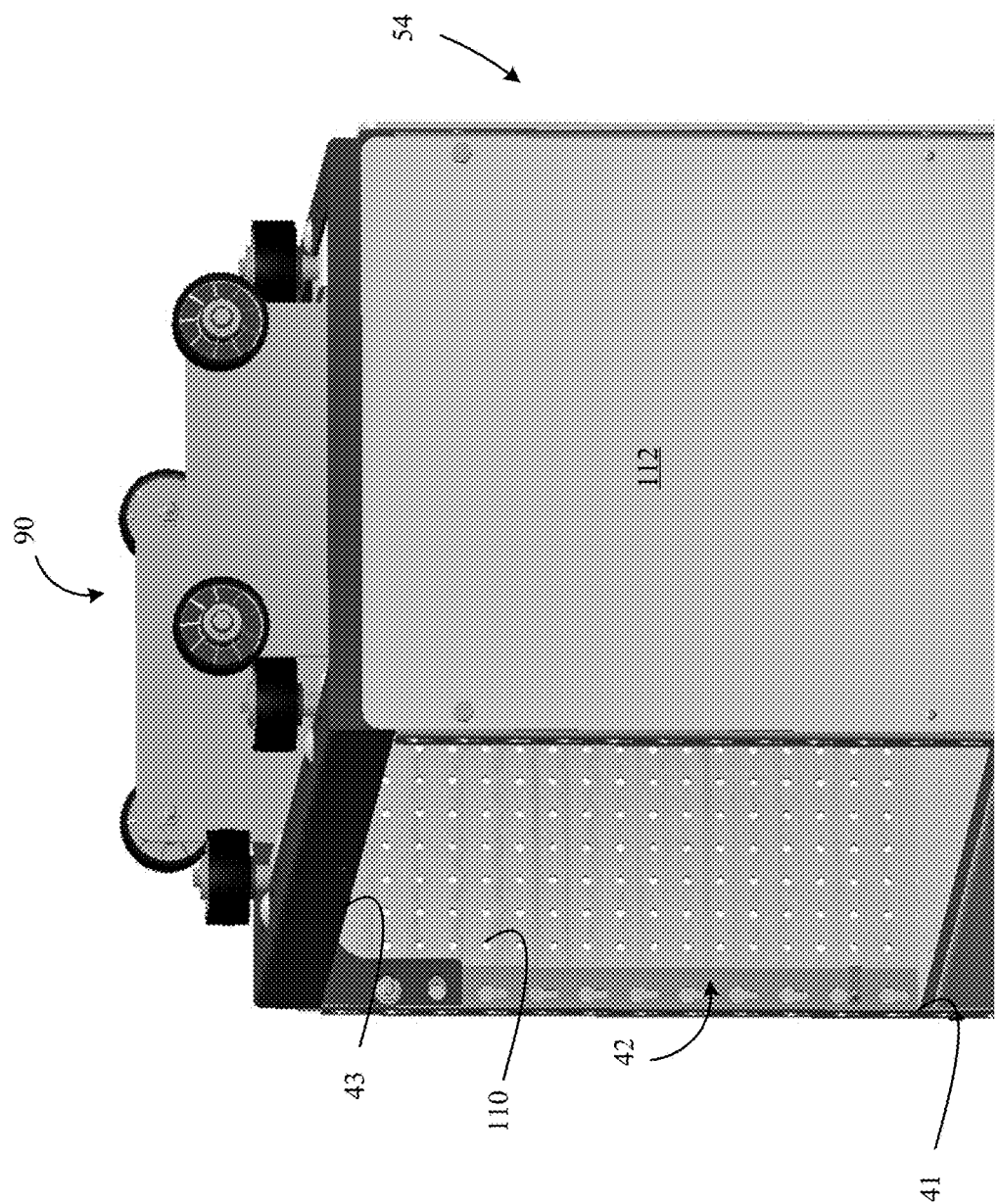
FIG. 12 is an enlarged perspective view of the storage unit of FIG. 11.
Figure 13:
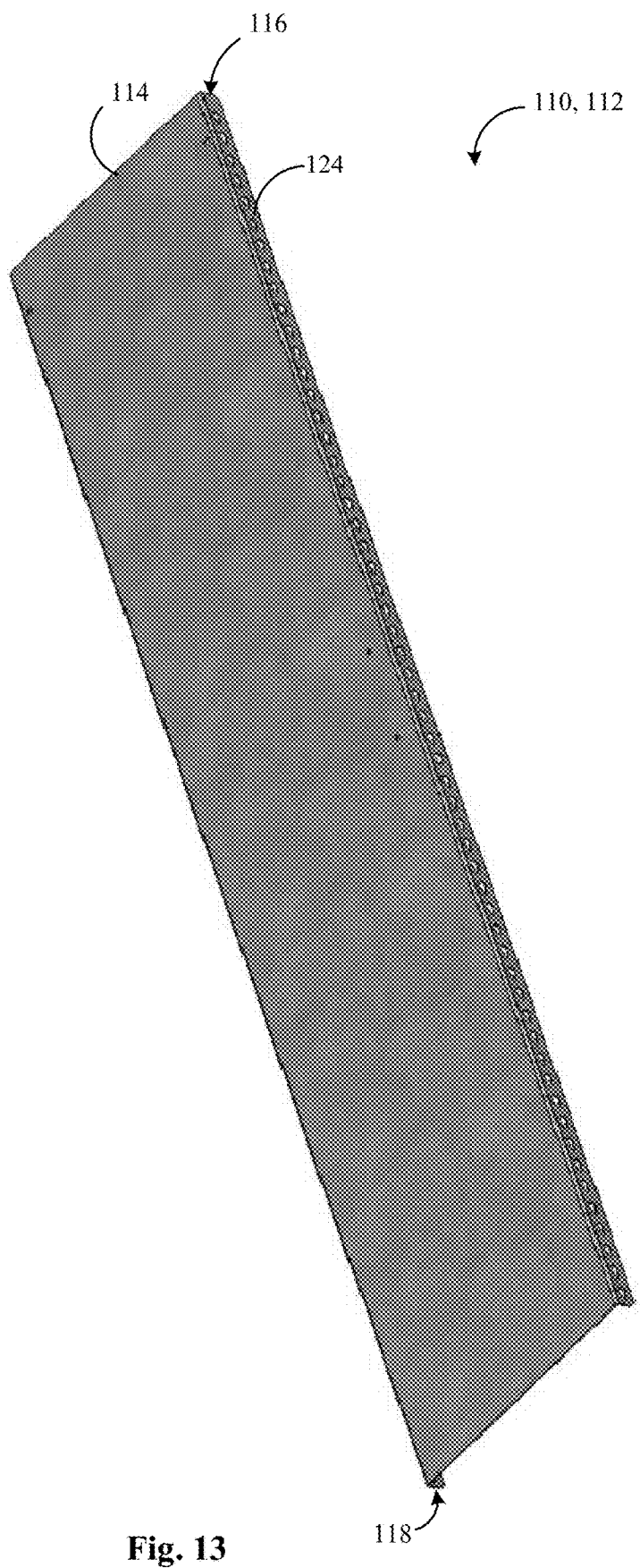
FIG. 13 is a perspective view of an illustrative shelf frame for connecting to the storage unit shown in FIG. 11.

FIGS. 11-13 illustrate a single storage unit of the pallet racking system, along with a corresponding suspension hanging system. As seen in FIGS. 11 and 12, the storage unit comprises a first shelf frame 110 and a second shelf frame 112. The first shelf frame 110 and the second shelf frame 112 can be disposed on parallel planes and can each be perpendicular to the front surface 42 and/or the rear surface 54 of the storage unit, such that the first shelf frame 110 and the second shelf frame 112 form lateral sides of the storage unit. The storage unit shelves 52 extend between the first shelf frame 110 and the second shelf frame 112. For instance, the first shelf frame 110 and the second shelf frame 112 can be spaced apart by a storage unit width 58. As is apparent, the first shelf frame 110 and the second shelf frame 112 are each disposed on a plane parallel to the sliding direction 32.

FIG. 13 is a perspective view of an exemplary first shelf frame 110. It should be noted that the construction of the second shelf frame 112 can be substantially similar (e.g., identical) to the first shelf frame 110, and thus, descriptions of the first shelf frame 110 below should apply to the second shelf frame 112 as well. In certain embodiments of the present disclosure, the first shelf frame 110 and the second shelf frame 112 each are of a quick-connect design to facilitate ease of installation, as will be described further below. With reference to FIG. 13, the first shelf frame 110 can have a generally planar portion 114 and one or more lip portions 116, 118. In some such embodiments, the lip portions 116, 118 can be integrally formed with the generally planar portion 114, such that the first shelf frame 110 can terminate in one or more lip portions 116, 118. Alternatively, the lip portions 116, 118 can be removably connectable to the generally planar portion 114.

Figure 14:
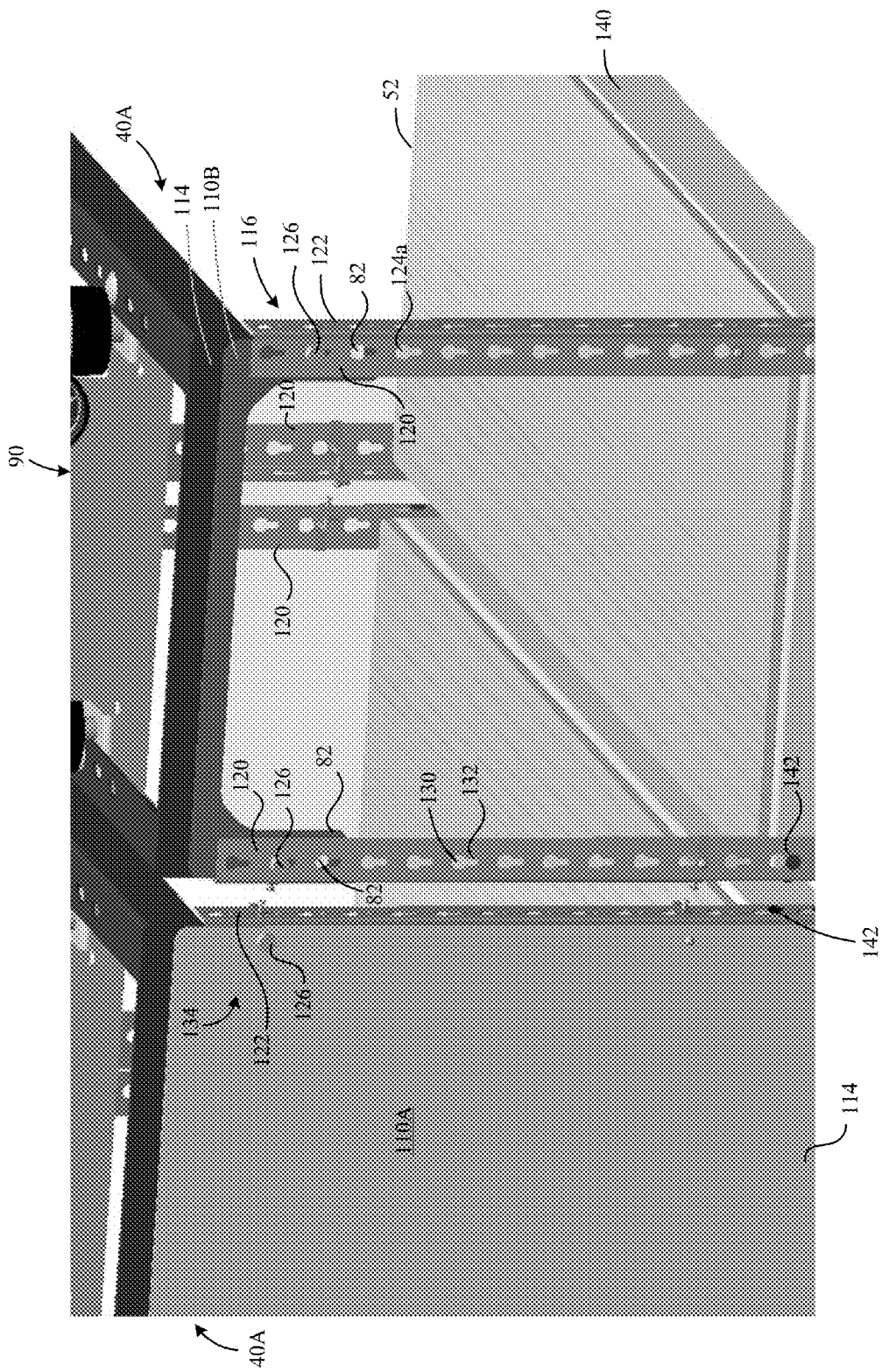
FIG. 14 is an enlarged perspective view of the modular pallet racking system shown in FIG. 1, with certain shelf frames removed or shown as a transparent feature to illustrate interior features.

FIG. 14 is an enlarged side perspective view of an illustrative first shelf frame 110A, 110B of two adjacent storage units. In this view, the generally planar portion 114 of the first shelf frame 110 of the storage unit 40B (on the right) is shown in transparent view to illustrate interior detail. As seen therein, the lip portion 116 comprises a first lip surface 120 and a second lip surface 122. The first lip surface 120 of the storage unit 40B (on the right) is visible, however, the first lip surface 120 of the storage unit 40A on the left is hidden. The first lip surface 120 can be generally parallel to the generally planar portion 114 and remain flush therewith when connected. The second lip surface 122 can be generally perpendicular to the first lip surface 120 and the generally planar portion 114. In the illustrated embodiment, two lip portions 116, 118 (each having a first lip surface 120 and a second lip surface 122) are provided for each first shelf frame 110. The second shelf frame 112 likewise has two lip portions 116, 118, although not illustrated in FIG. 14.

As seen in FIG. 14, each of the first lip surface 120 and the second lip surface 122 may include a plurality of connection interfaces 124 to permit connecting the first shelf frame 110 (and the second shelf frame 112) to a suspension hanger 80. For instance, a connection interface 124 of the first lip surface 120 can be aligned with a corresponding connection interface 82 of a corresponding suspension hanger 80. It should be understood that the plurality of connection interfaces 82 on the suspension hanger 80, as well as the plurality of connection interface 124 on the first lip surface 120 permit an interchangeable and/or modular connection between the first shelf frame 110 (and/or the second shelf frame 112) and the suspension hanger 80. Further, such embodiments reduce the time spent by a user in assembling the pallet racking system, by permitting ease of alignment of the first shelf frame 110 (and/or the second shelf frame 112) and the suspension hanger 80 by way of the plurality of connection interfaces 124, 82.

Continuing with the illustrated embodiment of FIG. 14, a bolted connection 126 between the first shelf frame 110 and the suspension hanger 80 is illustrated, though, of course, boltless connections are also contemplated within the scope of the present disclosure. For example, connection interface 124 and the connection interface 82 can have complementary "quick connections" therebetween, so as to permit ease of assembly. The complementary connection may include a protrusion (e.g., a pin, rib, peg, or the like) on one of the connection interfaces (124 or 82), and a complementary structure (e.g., an aperture) on the other of the connection interfaces (124 or 82). In the illustrated embodiment, the connector interfaces 124 of the first lip surface 120 and the second lip surface 122 are tear drop-shaped, with a leading portion 130 having an opening area sufficient to permit a leading edge of a protrusion or a bolt head to pass therethrough. The connector interfaces 124 also include a trailing portion 132 having an opening area less than the opening area of the leading portion 130, such that once a protrusion or a bolt head is inserted through the leading portion 130, it may be received and seated in the trailing portion 132 to fasten the first lip surface 120 with the connector interface 82 of the suspension hanger 80. Further, such embodiments also facilitate ease of alignment of each of the connector interface 124 of the first shelf frame 110 and the second shelf frame 112 with the connector interface 82 of the suspension hanger 80. As is apparent, the second lip surface 122 includes connector interface 124b substantially identical to the connector interface 124a of the first shelf frame 110.

Figure 15:
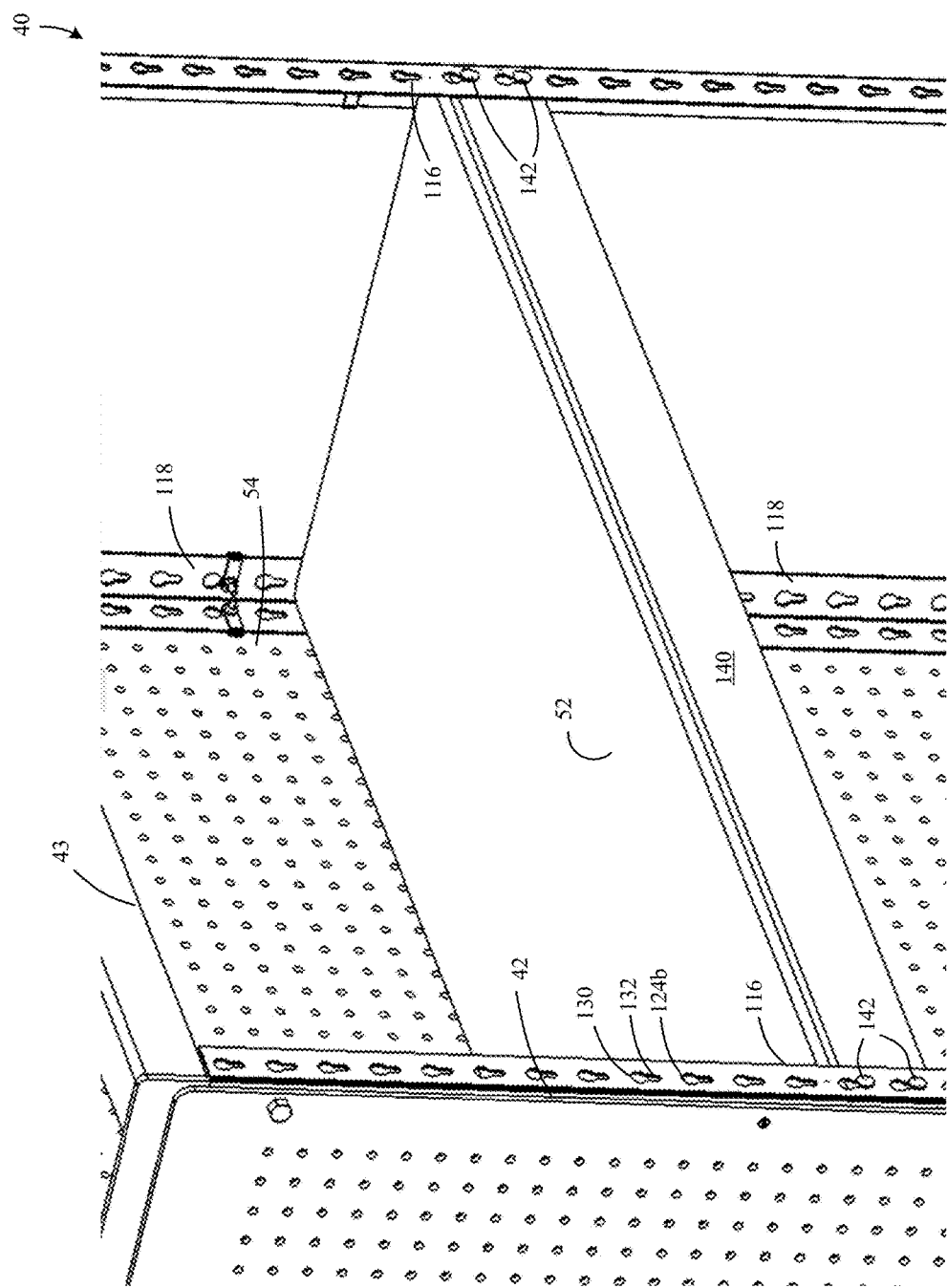
FIG. 15 is an enlarged perspective view of a storage unit.

In the illustrated embodiment of FIG. 15, the first shelf frame 110 may connect with the suspension hanger 80 near a top portion 134 of the first shelf frame 110. Similarly, the second shelf frame 112 may connect with the suspension hanger 80 near a top portion of the second shelf frame 112. Such embodiments permit a "suspended" storage unit, and the first shelf frame 110 and the second shelf frame 112 may not attach or anchor to any other supporting structure and remain freely suspended above the floor surface. Accordingly, the connection interfaces 124 provided on the middle and bottom portions of the first shelf frame 110 and the second shelf frame 112 may not connect to any other supporting structure (e.g., anchoring columns 20, beams, etc.)

Figure 16:
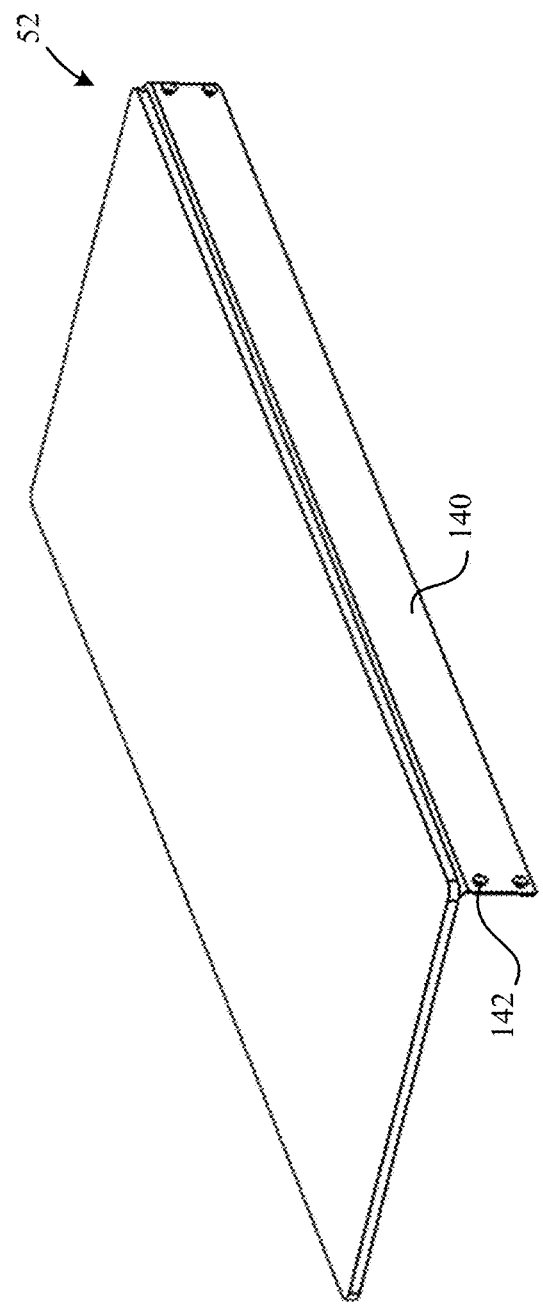
FIG. 16 is a perspective view of an exemplary storage unit shelf.

Referring now to FIGS. 15 and 16, the connection of one of the shelves with the second lip surface 122 is illustrated. As perhaps best seen in FIG. 16, a planar front surface 140 of each shelf 52 has one or more complementary connectors 142 that may be connected to a corresponding connector interface 124 of the second lip surface 122. As is apparent, the connector interface 124b of the second lip surface 122 is structurally similar to the connector interface 124a of the first lip surface 120. In the illustrated embodiment of FIG. 16, the complementary connector 142 of the shelf 52 can be a protrusion that protrudes out of a generally planar front portion of the shelf 52. Correspondingly, as seen in FIG. 15, the connector interface 124b of the second lip surface 122 includes a plurality of openings to receive the protrusion of the shelf 52. However, other types of complementary connections are also contemplated within the scope of the present disclosure. Further, instead of, or in addition to providing the planar front surface 140 with a plurality of complementary connectors 142, other surfaces (such as rear, or lateral) of each shelf 52 unit may also be provided with complementary connector 142 that may interface with the connector interface 124a,b of the first or second lip surfaces. Further, while the embodiment illustrated in FIG. 15 shows the complementary connectors 142 of the shelves engaging with the second lip surface 122 of one lip portion 116 of each of the first shelf frame 110 and the second shelf frame 112, the complementary connectors 142 of the shelves may optionally engage with the second lip surface 122 of the second lip portion 118 (e.g., near the rear surface 54 of the shelf 52) to optionally provide an additional secure connection.

As seen from FIG. 15, the connector interfaces 124 of the second lip surface 122 are tear drop-shaped, with a leading portion 130 having an opening area sufficient to permit a leading edge of a respective protrusion of each shelf 52 to pass therethrough. The connector interfaces 124 also include a trailing portion 132 having an opening area less than the opening area of the leading portion 130, such that once a protrusion is inserted through the leading portion 130, it may be received and seated in the trailing portion 132 to fasten the second lip surface 122 with a respective shelf 52. As is appreciable, the connector interfaces 124 of the first lip surface 120 and the second lip surface 122 are structurally similar and function substantially similar to each other. Thus, such embodiments advantageously allow the pallet racking system to be supplied as a kit with standardized connections, such that the connection of the first shelf frame 110, the second shelf frame 112, and shelves of the storage unit can be accomplished in a standardized/substantially similar manner so as to achieve a modular assembly. Optionally, substantially the entire kit may be assembled using such "quick connection" interfaces and/or boltless assemblies. Accordingly, such embodiments facilitate ease of assembly of the pallet racking system.

Figure 17:
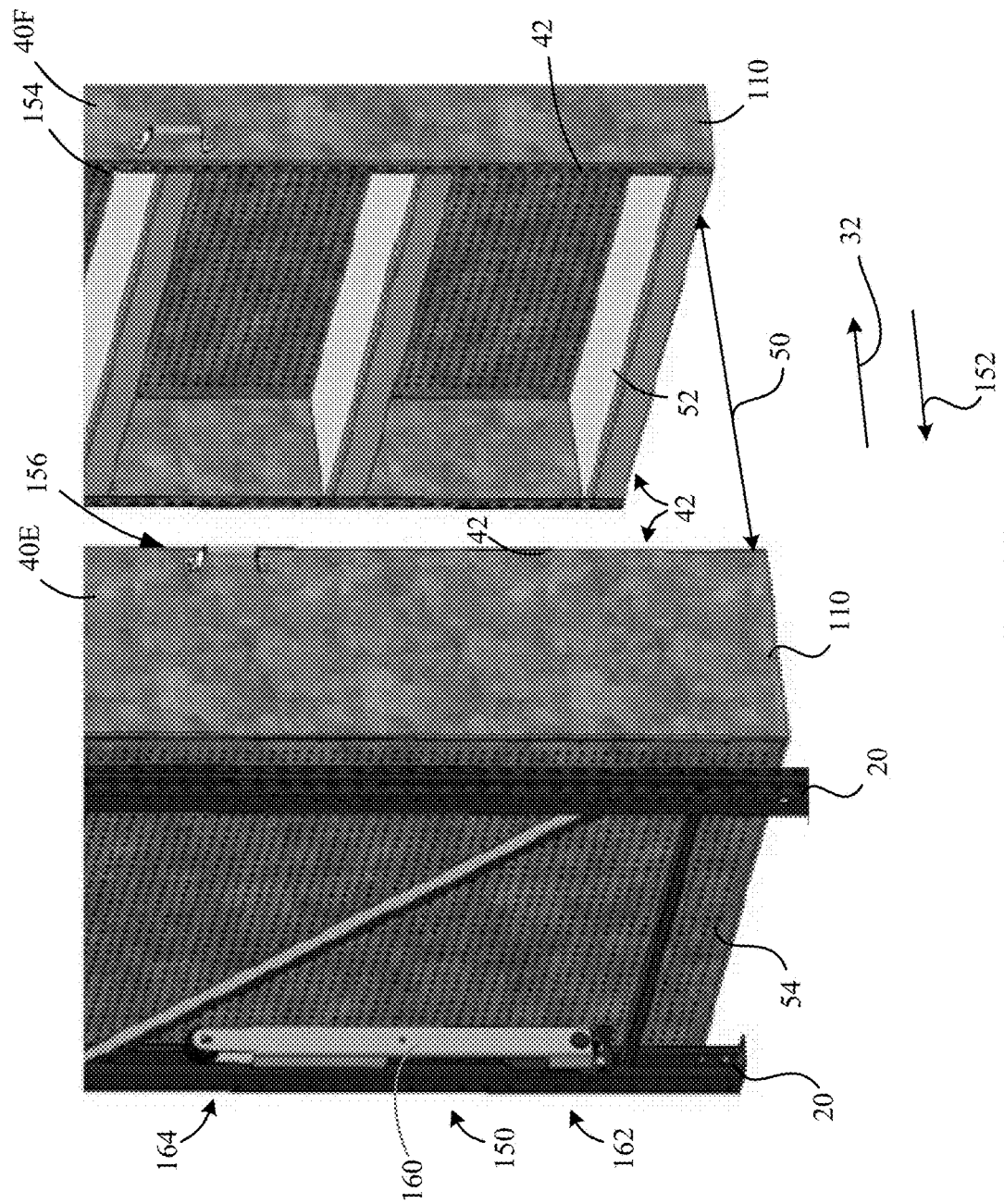
FIG. 17 is a perspective view of a lower portion of the modular pallet racking system of FIG. 1 shown in an unlocked position.
Figure 18:
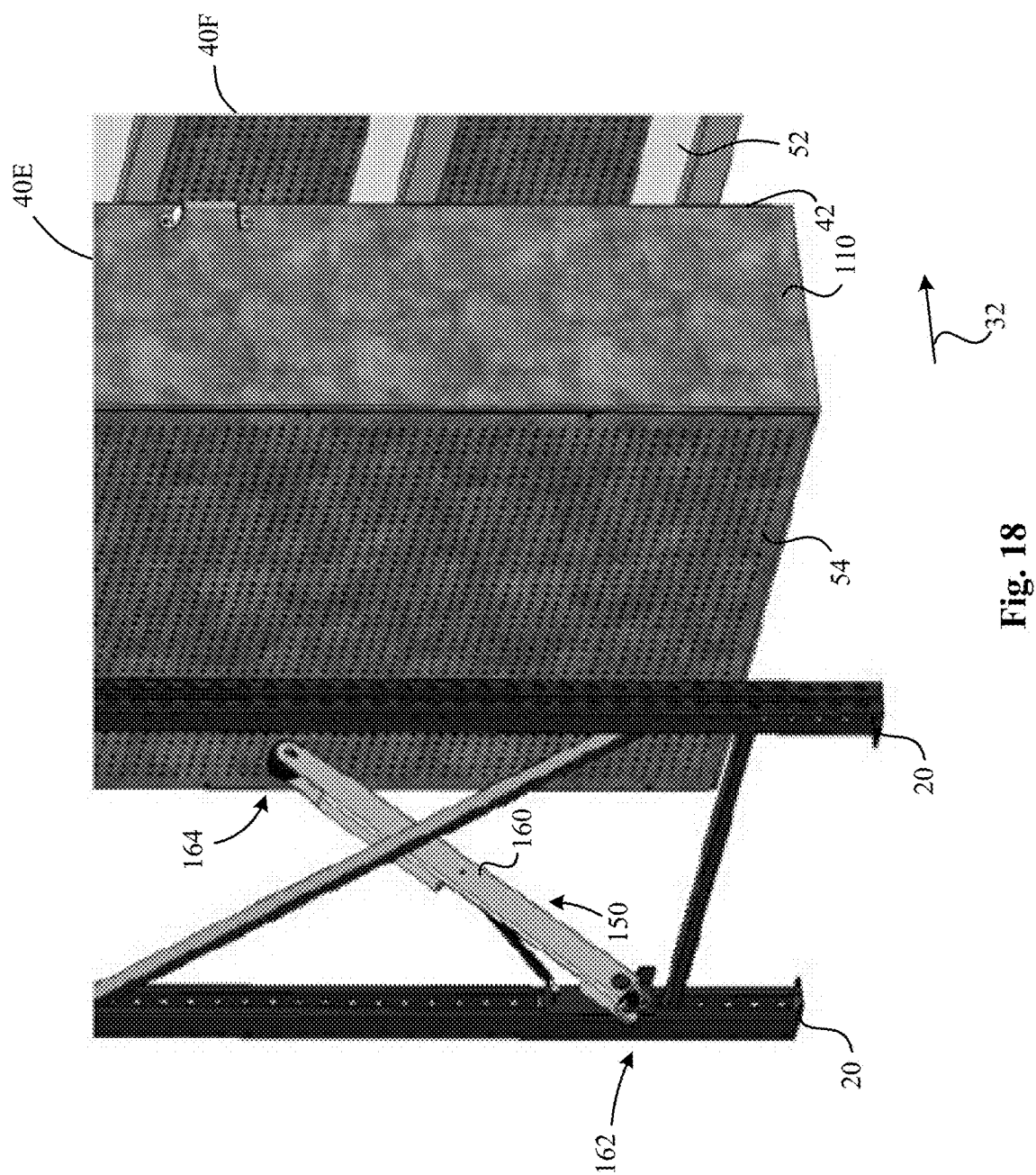
FIG. 18 is a perspective view of a lower portion of the modular pallet racking system of FIG. 17 shown in an intermediate position between an unlocked position and a locked position.
Figure 19:
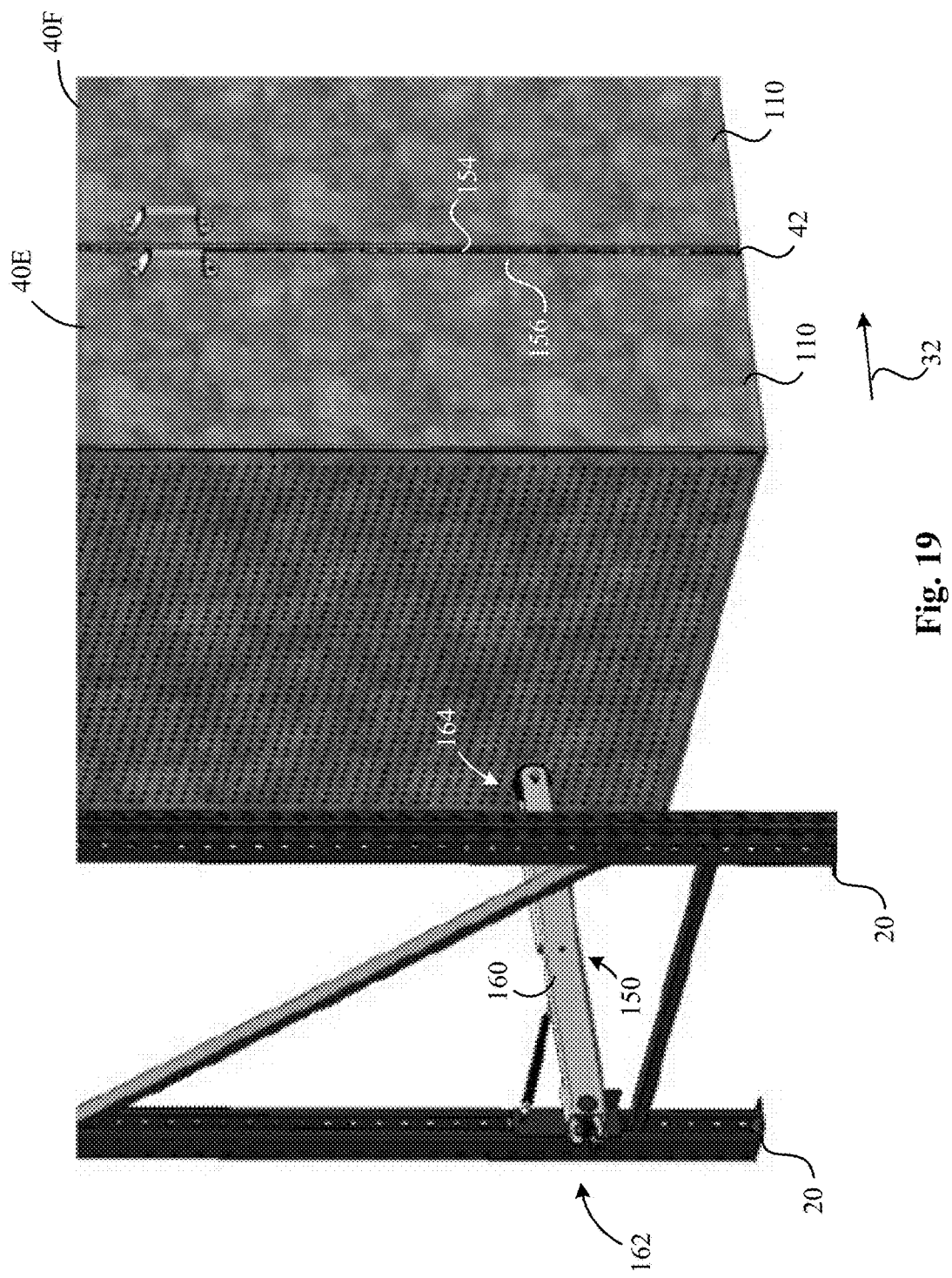
FIG. 19 is a perspective view of a lower portion of the modular pallet racking system of FIG. 17 shown in a locked position.

FIGS. 17-19 illustrate a lower portion of the modular pallet racking system. As illustrated therein, in some examples, the storage units of the modular pallet racking system may be locked to improve security, and/or prevent theft (or damage) of items stored in the storage units. In some such embodiments, the modular pallet racking system may include a locking assembly 150 to lock storage units so as to prevent relative sliding motion of one storage unit with respect to other storage units (e.g., along the sliding direction 32).

FIG. 17 illustrates the modular pallet racking system in an unlocked position. As seen in FIG. 17, in the unlocked position, each storage unit can be slid with respect to an adjacent storage unit to create an aisle space 50 therebetween, as previously described. As is appreciable, (e.g. from FIG. 3) the sum of depths of each storage unit can be generally less than the overall width 62 of the pallet racking system, by an amount corresponding to an aisle depth 56. For instance, in one example, the overall width 62 of the pallet racking system can be about 12 feet, and each storage unit can have a storage unit depth 56 of about 18 inches. In such cases, if the modular pallet racking system has six storage units, then the aisle space 50 will have an aisle depth 56 of about three feet. However, the dimensions provided herein should not be seen as limiting, and in general, aisle depth 56 between about 1.5 feet and about 4 feet, and preferably between about 2 feet and about 3 feet can be provided using the embodiments disclosed herein. In some such cases, each storage unit with the exception of storage unit 40E can be slid by a distance up corresponding to the aisle depth 56 to create an aisle space 50 with respect to an adjacent storage unit.

FIG. 18 illustrates the modular pallet racking system in an intermediate position, when moving from the unlocked position to a locked position, and FIG. 19 illustrates the modular pallet racking system in a locked position. To move the modular pallet racking system from a locked position to an unlocked position, each storage unit can be slid in a direction 152 opposite to the sliding direction 32). Conversely, to move the storage units from the unlocked position to the locked position, the storage units can be slid in the sliding direction 32 such that their respective shelf frames 110, 112 abut each other. For instance, in the illustrated embodiment, an edge 154 of the first shelf frame 110 of one storage unit abuts against a respective edge 156 of the first shelf frame 110 of an adjacent storage unit. Once the storage units are slid such that there is no aisle space 50 between them, a locking assembly 150 can be engaged so as to lock the storage units so as to restrict further relative sliding. Once locked, as shown in FIG. 19, the storage shelves of each storage unit confront each other and are positioned so as to abut each other. In the locked position, the storage units are not slidable and their contents are inaccessible from an exterior of the storage units.

Figure 20:
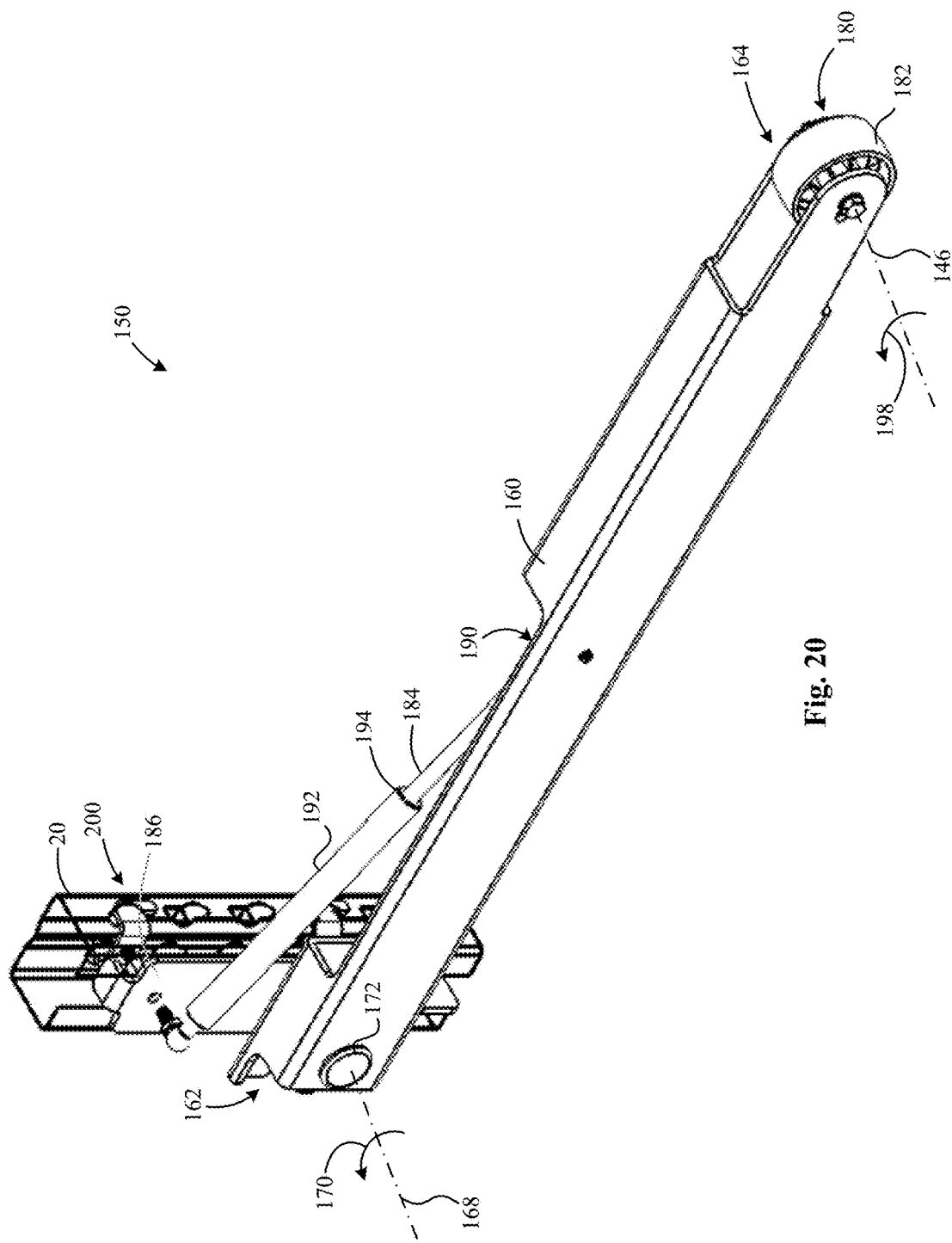
FIG. 20 is a perspective view of a locking assembly.
Figure 21:
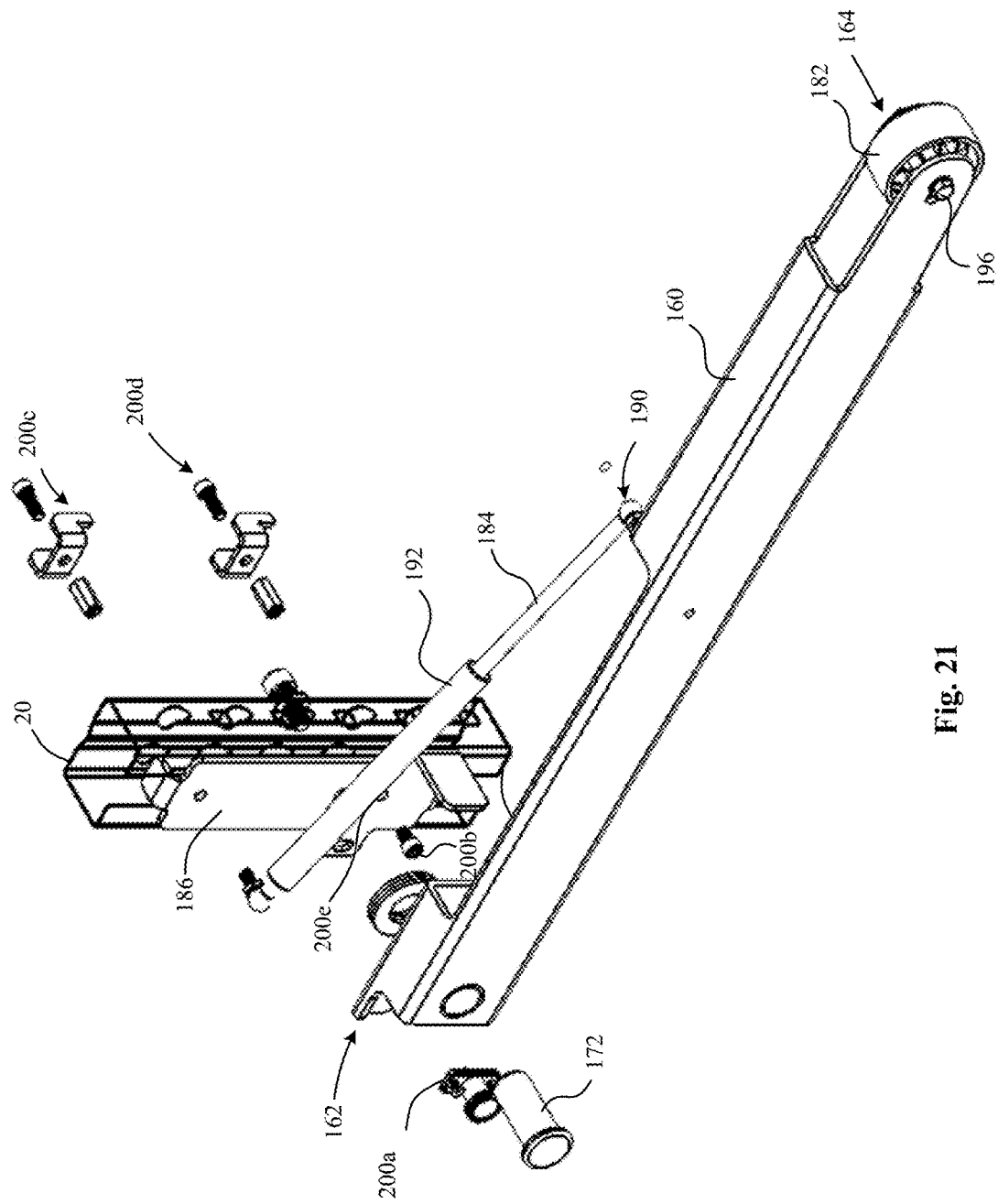
FIG. 21 is an exploded perspective view of the locking assembly of FIG. 21.

FIGS. 20-24 illustrate various detailed views of a locking assembly 150 illustrated in FIGS. 17-19 according to an embodiment of the present disclosure. Referring again to FIG. 20, the locking assembly 150 can include a locking arm 160 pivotably connected with respect to the anchoring columns 20. As best seen in FIG. 21, the locking arm 160 has a first end 162 and a second end 164 opposite to the first end. The first end 162 includes an aperture 166 and is pivotally coupled to the anchoring columns 20, whereas the second end 164 remains in contact with a storage unit (as best seen in FIGS. 17-19). The locking arm 160 may pivot about a pivot axis 168 along the direction 170 shown in FIG. 20. In one example, the pivotal connection can be achieved by a pivot pin 172. As seen in the exploded perspective view of FIG. 21, the pivot pin 172 can be received in the aperture 166 (illustrated by dashed lines in FIGS. 22A and 22B). Referring back to FIGS. 17-19, the locking arm 160 is generally parallel to the anchoring columns 20 (e.g., vertically oriented) when the storage units are in the unlocked position and is generally perpendicular to the anchoring columns 20 when the storage units are in the locked position. The orientation of the locking arm 160 in the locked position can also be parallel to the sliding direction 32.

Returning to FIG. 21, the second end of the locking arm 160 includes an engagement mechanism 180 that can engage with a surface (e.g., rear surface 54, as seen in FIG. 19) of the storage unit. In the illustrated embodiment, the engagement mechanism 180 comprises a roller system with one or more rollers 182 contacting against a surface (e.g., a rear surface 54) of a storage unit as shown in FIGS. 19 and 20. In an exemplary embodiment, the roller 182 contacts a storage unit positioned on the end (e.g., storage unit 40E) of the pallet racking system (e.g., near the anchoring columns 20). In such examples, the storage unit 40E may not be moved along the sliding direction 32, except to lock the storage units. When the storage unit on the end (e.g., storage unit 40E) is moved along direction 152 toward the anchoring columns 20, the roller 182 may roll due to frictional contact between the rear surface 54 and the roller 182. While the illustrated example of the engagement mechanism 180 comprises a roller system, other frictional or frictionless engagement mechanisms are contemplated within the scope of the present disclosure.

With continued reference to FIG. 20, the locking assembly 150 includes a locking spring 184 connected to the locking arm 160 so as to keep the locking arm 160 to be spring biased in the locked position. The opposite end 190 of the spring can be attached to the locking arm 160. Referring now to FIGS. 22A and 22B, two different positions of the locking arm 160 are illustrated. In FIG. 22A, the locking arm 160 is shown in between the locked position and the unlocked position, whereas in FIG. 22B, the locking arm 160 is shown in the locked position. In FIG. 22B, the locking spring 184 fully extends out of a spring housing 192 to keep the locking arm 160 to be spring biased in the locked position. Returning to FIG. 19, as the storage unit is moved toward the anchoring columns 20, the locking spring 184, as seen in FIG. 22A retracts toward the spring housing 192. In the unlocked position, the locking spring 184 fully retracts such that the second end 190 of the locking spring 184 is proximal to an edge 194 of the spring housing 192, such that the locking spring 184 nests within the spring housing 192.

As is appreciable, in the illustrated embodiment, the storage units, by virtue of the spring biasing, is biased to remain in the locked position. The storage units can be unlocked by exerting force (e.g., pushing force) on the storage unit 40E (e.g., on or near the handle 100) so as to overcome the spring force exerted by the locking spring 184. The pushing force is transmitted through the contact between the engagement mechanism 180 and the rear surface 54 of the storage unit. For instance, when the storage unit on the end (e.g., storage unit 40E) is slid toward the anchoring columns 20, the roller rotates about its pivot point 196 in the direction 198 (illustrated in FIG. 20) which overcomes the spring bias. Accordingly, the locking spring 184 retracts into the spring housing 192, in turn rotating the locking arm 160 about the pivot point 196 from the unlocked position (e.g., shown in FIG. 22B) to the locked position (e.g., along the intermediate position shown in FIG. 22A).

FIGS. 23A, 23B, 24A and 24B illustrate respectively, an enlarged perspective view and a side and rear view of the locking assembly 150. As mentioned previously, the locking assembly 150 includes a bracket 186 that attaches to the anchoring columns 20. As perhaps best seen in FIG. 23A, the locking arm 160 is connected to the anchoring columns 20 by way of one or more mounting fasteners 200. The mounting fasteners can include a spring plunger 200a and a bolt 200b. The bolt 200b can be received by the bracket 186 through an aperture (200e, best seen in FIG. 21). The spring plunger 200a can be biased so as to push against the bolt 200b when the locking arm 160 is in the locked position. In this position, the spring plunger 200a can substantially surround and enclose the bolt 200b such that the bolt 200b is inaccessible. In the unlocked position, as the locking spring 184 retracts, the locking arm 160 pivots about the pivot 162. In this position, the spring plunger 200a does not surround the bolt 200b, and the locking arm 160 may be disconnected, for instance, by disengaging the bolt 200b (e.g., using a hex-headed wrench). While a bolt 200b is illustrated, it should be understood that other fasteners can be used to connect the locking arm 160 to the bracket 186. As is appreciable, in such embodiments, the locking assembly 150 may not be disconnected from the column 20, except when the locking arm 160 is in the unlocked position. Such embodiments promote additional security, so that the locking assembly 150 may not be disconnected from the anchoring columns 20 in the locked position.

Continuing with FIGS. 23A, 23B, 24A and 24B, the locking assembly 150 includes a plurality of fasteners 200c and 200d that permit connection of an external secure locking system so as to prevent unauthorized access. For instance, as illustrated, fasteners 200c and 200d attach the bracket 186 to the columns. An external lock, for instance a pad lock or other types of secure locking systems can be connected to the fasteners 200c and 200d. In use, once the storage units 40 are pushed so that there is no aisle space between them, the locking arm 150 is lowered and pushes against a storage unit (e.g., unit 40E seen in FIG. 19). A secure lock such as a pad lock is attached to the column 20 by way of the fasteners 200c, 200d and the system can then be locked so as to prevent unauthorized release of releasing the locking arm 160 from the locked position to the unlocked position. As described previously, the bolt 200b in the locked position is inaccessible, so that removal or disengagement of the entire locking assembly 150 from the column 20 (by releasing the bolt 200b, or fasteners 200c and 200d) is prevented. In such cases, only users that have a key access to the secure locking system may open the secure lock (pad lock connected to columns 20 by fasteners 200c, 200d), and thereby release the locking arm 160 from the locked position to the unlocked position so as to gain access to the contents stored in the storage unit.

As mentioned previously, the pallet racking system 10 may be supplied to a user in the form of a kit requiring assembly at the user's location. To assemble the pallet racking system 10, the user may arrange the plurality of anchoring columns 20. The user may adjust the spacing between the anchoring columns 20 to achieve the desired overall width 62 and overall depth 60 of the pallet racking system 10. The user may then connect a plurality of pallet shelves 12 to the anchoring columns 20 (e.g., by inserting fasteners through connection points on the anchoring columns 20). The user can then connect the suspension hanging system 30. To assemble the suspension hanging system 30, the user can connect the first and second beams 70, 72 to the anchoring columns 20 using connection points 24. The first and second beams 70, 72 can be connected such that they are below a first pallet shelf of the plurality of pallet shelves 12, wherein, the first pallet shelf is proximal to the floor surface. That is, any other pallet shelf connected to the anchoring columns 20 is connected above the first pallet, and are distal to the floor surface. The user may connect the roller system 90 to a desired connection point 86 of the suspension hangers 80 to accommodate a desired width 58 and depth 56 of storage unit 40. Finally, the user may connect the storage units 40 to the connection interface 124 of the suspension hanger 80, and assemble the pallet racking system 10.

Optionally, the pallet racking system may supplied as a kit with or without several components. For instance, if the user already has certain components, such as first beam, second beam, a plurality of anchoring columns and/or a plurality of pallet shelves, the pallet racking system may be supplied without the first and second beams, a plurality of anchoring columns and a plurality of pallet shelves. In such cases, the pallet racking system may be integrated into existing structures that may support and/or connect to a plurality of mobile storage units. For instance, in such cases, the pallet racking system may be supplied as kit to include the components the user may not have, such as a plurality of storage units, and a plurality of suspension hanging systems to connect to the storage units to permit relative sliding therebetween. The user may also be able to choose the number of storage units to include, based on space available. For instance, the user may be able to use fewer storage shelves if the modular pallet racking system is to be used in a garage, basement, and the like, and more storage shelves if the modular pallet racking system is to be used in a warehouse, or in other industrial applications. Optionally, the user may want to use existing storage units, pallet shelves and columns (and/or other existing structural components to support sliding motion of the storage units). In such cases, the pallet racking system may be supplied as a kit to include a first beam, a second beam, a plurality of suspension hanging systems, with connection interfaces to permit connecting to storage units. In such cases, the kit may include a pair of shelf frames for facilitating connection to a respective suspension hanging system and a respective storage unit. Such embodiments permit the user to customize the storage solution best suited to their storage needs.

In use, a method of installing a modular pallet racking system using a supplied kit involves the step of providing a pallet racking system according to any of the disclosed embodiments. The method may involve the step of connecting the first beam and the second beam to one or more anchoring columns. The method of assembly may then involve the step of assembling a plurality of suspension hanging system, by engaging each roller system to a corresponding suspension hanger. The method may further involve the step of positioning the plurality of suspension hanging systems on the first and the second beams so as to providing sliding engagement between the suspension hanging systems and the first and second beams. The method may then involve the step of assembling a plurality of storage units, by engaging one or more shelf frames to a respective storage unit. Finally, the method may involve the step of connecting one or more storage unit shelves to a respective connector interface of a shelf frame.

The pallet racking system according to the present disclosure provides several advantages. Some examples of the disclosed pallet racking systems reduce the amount of floor space (e.g., linear or square) occupied by the pallet racking systems relative to conventional pallet racking systems. Further, some examples of the disclosed pallet racking system provide a modular storage solution with storage units that can be added or removed to accommodate a user's needs. Further, the entire pallet racking system can be shipped to a customer as a kit, providing the ability to customize the dimensions of the pallet racking system, and minimizing transportation costs.

The invention claimed is:

1. A modular pallet racking kit, connectable to one or more anchoring columns connected to one or more pallet shelves, so as to support a plurality of suspended storage units suspended below a pallet shelf, the modular pallet racking kit comprising:
   a plurality of suspension hanging systems, each suspension hanging system being connectable to a respective storage unit therebelow, each suspension hanging system being slidable relative to the anchoring columns in a sliding direction generally perpendicular to at least one anchoring column, each suspension hanging system comprising a suspension hanger having a plurality of connection interfaces for connecting to a storage unit suspended therebelow;
   a plurality of shelf frames, each shelf frame comprising one or more connector interfaces connectable to a respective storage unit, the connector interfaces being further connectable to the connection interfaces of a respective suspension hanger, such that when connected, each storage unit is suspended from each suspension hanger, and is slidable relative to an adjacent storage unit along the sliding direction; and
   a locking assembly for moving the plurality of storage units between a locked position and an unlocked position, whereby in the locked position, relative sliding between adjacent storage units is restricted, and in the unlocked position, relative sliding between adjacent storage units is permitted, the locking assembly comprising a locking arm having a first end and a second end, the locking arm being pivotably connectable to at least one anchoring column at its first end, and the locking arm being engageable with a storage unit of the plurality of storage units at the second end.

2. The modular pallet racking kit of claim 1, further comprising a first beam and a second beam each being elongate in shape and disposed about a longitudinal axis, the first and second beams each being connectable to one or more anchoring columns such that when the first and second beams are connected to the anchoring columns, the first beam and the second beam are generally parallel to each other and the longitudinal axes of each of the first and second beams being generally parallel to the sliding direction.

3. The modular pallet racking kit of claim 1, further comprising two shelf frames for each storage unit, each shelf frame being positionable parallel to each other, such that when positioned and connected to the respective suspension hanger, the shelf frames form lateral sides of the respective storage unit.

4. The modular pallet racking kit of claim 1, wherein, each shelf frame comprises a generally planar portion and one or more lip portions integrally formed with the generally planar portion,
   the generally planar portion of each shelf frame is positionable so as to be parallel to the sliding direction, and each lip portion includes a first lip surface and a second lip surface, the first lip surface being generally coplanar with the generally planar portion, and the second lip surface being formed perpendicular to the generally planar portion.

5. The modular pallet racking kit of claim 4, wherein each storage unit includes a storage unit shelf, wherein the connector interfaces of each shelf frame are provided on the first lip surface and the second lip surface, wherein the connector interface of the first lip surface is connectable to at least one of the respective storage unit and the respective suspension hanger, and the connector interface of the second lip surface is connectable to the storage unit shelf.

6. The modular pallet racking kit of claim 1, wherein the locking assembly comprises a locking spring housed in a spring housing, the locking spring being connectable to the locking arm so as to bias the locking arm to remain in the locked position and, wherein the locking arm is configured to move from the locked position to the unlocked position by a force acting on the storage unit of the plurality of storage units engaging with the second end of the locking arm, the locking spring being further configured to fully extend from the spring housing when the storage units are in the locked position, the locking spring being configured to fully retract into the spring housing when the storage units are in the unlocked position.

7. The modular pallet racking kit of claim 6, wherein the locking assembly comprises one or more mounting fasteners for mounting the locking assembly to an anchoring column, the one or more mounting fasteners being inaccessible when the locking arm is in the locked position, the one or more fasteners being accessible to disconnect the locking assembly when the locking arm is in the unlocked position.

8. A modular pallet racking kit, comprising:
a support surface;
a plurality of suspension hanging systems positionable above a floor surface slidable in a sliding direction relative to the support surface, each suspension hanging system comprising a suspension hanger, a roller system, and a plurality of connection interfaces so as to be modularly connectable to a storage unit therebelow, the suspension hanger slidably connectable to the support surface such that when connected each suspension hanger is movable generally along a longitudinal axis of the support surface, the roller system being connectable to the suspension hanger and slidable along the support surface;
each suspension hanging system being configured to support the storage unit to be suspended above a floor surface, the sliding movement of a suspension hanging system of the plurality of suspension hanging systems relative to an adjacent suspension hanging system configured to create an aisle space between two adjacent storage units,
each suspension hanging system being oriented such that a line perpendicular to a front surface of the storage unit suspended below a respective suspension hanging system is generally parallel to the sliding direction
wherein the roller system comprises:
at least a pair of track rollers that are slidable along the support surface, the track rollers being rotatable about a track roller rotational axis; and
at least a pair of guide rollers rotatable about a guide roller rotational axis, the guide roller rotational axis being perpendicular to the track roller rotational axis, wherein the guide rollers are disposed in a plane parallel to a first track and a second track, such that the guide rollers guide the suspension hangers and the storage units suspended thereunder to slide along the support surface in a guided manner when the first track and the second track are non-parallel to each other.

9. The modular pallet racking kit of claim 8, wherein the support surface being defined by surfaces of a first beam and a second beam, each of the first beam and the second beam being configured to be load bearing so as to support a suspended storage unit connectable to a respective suspension hanging system, and the first beam and the second beam being generally parallel to each other, a longitudinal axis of each of the first and second beams being generally parallel to the sliding direction.

10. The modular pallet racking kit of claim 9, further comprising
a plurality of pallet shelves, each pallet shelf having a generally planar surface surrounded by a plurality of edges;
a plurality of anchoring columns disposed generally along a column axis the column axis being generally perpendicular to the generally planar surface of each pallet shelf, each anchoring column being elongate in shape and coupled to the anchoring columns proximal to an edge of the plurality of edges of each pallet shelf so as to support each pallet shelf, the first beam and the second beam each being modularly connectable to one or more anchoring columns of the plurality of anchoring columns.

11. The modular pallet racking kit of claim 10, wherein each of the first beam and the second beam being connectable to any location on an anchoring column of the plurality of anchoring columns generally along the column axis, so as to modularly connect thereto.

12. The modular pallet racking kit of claim 11, wherein a distance between two anchoring columns of the plurality of anchoring columns is adjustable so as to vary overall dimensions of the pallet racking kit.

13. The modular pallet racking kit of claim 12, wherein the suspension hanger is slidably connectable to the first beam and the second beam such that when connected, each suspension hanger is movable generally along the longitudinal axes of the first beam and the second beam, each suspension hanger comprising:
a plurality of connection interfaces for connecting to a storage unit suspended therebelow,
a first elongate member proximal to the first beam, and
a second elongate member proximal to the second beam, the plurality of connection interfaces being coupled to the first and second elongate member, and extending below a plane on which the first and second beams are disposed.

14. The modular pallet racking kit of claim 13, wherein the pair of track rollers are slidable along the first and second beams.

15. The modular pallet racking kit of claim 14, wherein the first track extends from an interior surface of the first beam, and the second track extends from an interior surface of the second beam, the interior surface of the first beam and the second beam are each configured to face toward each other when the first beam and the second beam are each connected to the plurality of anchoring columns.

16. The modular pallet racking kit of claim 15, wherein each suspension hanger comprises a third elongate member and a fourth elongate member, each of the third and fourth elongate members being generally perpendicular to each of the first elongate member and the second elongate member, the third and fourth elongate members having a plurality of connection points for connecting to the roller system, the connection points being defined along a longitudinal axis of the third and fourth elongate members such that the roller system is connectable at various points along the longitudinal axis of the third and fourth elongate members, the adjustable connection of the roller system and the third and fourth elongate members permits storage units of different widths to be connectable with the suspension hangers.

17. The modular pallet racking kit of claim 14, wherein the first track extends from an exterior surface of the first beam, and the second track extends from an exterior surface of the second beam, the exterior surface of the first beam and the second beam are each configured to face away each other when the first beam and the second beam are each are connected to the plurality of anchoring columns.

18. The modular pallet racking kit of claim 8, wherein each storage unit has a depth in a direction generally parallel to the sliding direction and a width in direction generally perpendicular to the sliding direction, and, when assembled, the pallet racking kit having an overall depth in a direction generally perpendicular to the sliding direction and an overall width in a direction generally parallel to the sliding direction, wherein the width of each storage unit generally equals the overall depth of pallet racking kit, and the sum of depths of each storage unit is generally less than the overall width of the pallet racking kit.

19. A method of assembling a modular pallet racking system, comprising:

providing a modular pallet racking system comprising a plurality of suspension hanging systems and a plurality of shelf frames, each of the plurality of suspension hanging systems including a roller system and a suspension hanger, the roller system comprising: i) at least a pair of track rollers being rotatable about a track roller rotational axis, and ii) at least a pair of guide rollers rotatable about a guide roller rotational axis, the guide roller rotational axis being perpendicular to the track roller rotational axis;

connecting a first beam and a second beam to one or more anchoring columns;

assembling the plurality of suspension hanging systems, by engaging each roller system to a corresponding suspension hanger;

positioning the plurality of suspension hanging systems on the first and the second beams so as to provide sliding engagement between the suspension hanging systems and the first and second beams, wherein the guide rollers are disposed in a plane parallel to a first track and a second track, such that the guide rollers guide the suspension hangers to slide along the first beam and the second beam in a guided manner when the first track and the second track are non-parallel to each other;

assembling a plurality of storage units by engaging one or more shelf frames to a respective storage unit, each storage unit including one or more storage unit shelves; and connecting one or more storage unit shelves to a respective connector interface of the one or more shelf frames.

* * * * *